(12) United States Patent
Hirano et al.

(10) Patent No.: US 8,498,020 B2
(45) Date of Patent: Jul. 30, 2013

(54) IMAGE PROCESSING APPARATUS, IMAGE FORMING APPARATUS, AND IMAGE PROCESSING METHOD

(75) Inventors: Masanori Hirano, Kanagawa (JP); Taku Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 254 days.

(21) Appl. No.: 12/926,826

(22) Filed: Dec. 13, 2010

(65) Prior Publication Data

US 2011/0141528 A1  Jun. 16, 2011

(30) Foreign Application Priority Data

Dec. 11, 2009  (JP) .................................. 2009-282087
Nov. 25, 2010  (JP) .................................. 2010-262221

(51) Int. Cl.
*G06K 15/00* (2006.01)
(52) U.S. Cl.
USPC ........ 358/3.13; 358/502; 358/3.21; 358/3.01; 358/518; 347/43
(58) Field of Classification Search
USPC .......... 358/3.13, 518, 502, 3.21, 3.01; 347/43
See application file for complete search history.

(56) References Cited

U.S. PATENT DOCUMENTS

| | | | | |
|---|---|---|---|---|
| 5,067,025 A | * | 11/1991 | Kitagawa | .................... 358/3.2 |
| 7,102,791 B2 | | 9/2006 | Hirano et al. | |
| 7,499,198 B2 | | 3/2009 | Hirano | |
| 8,011,756 B2 | * | 9/2011 | Ike et al. | .................... 347/43 |
| 2002/0171874 A1 | | 11/2002 | Hirano et al. | |
| 2004/0218221 A1 | | 11/2004 | Hirano et al. | |
| 2005/0200900 A1 | | 9/2005 | Hirano | |
| 2006/0044616 A1 | | 3/2006 | Satoh et al. | |
| 2008/0123146 A1 | | 5/2008 | Ike et al. | |
| 2008/0278764 A1 | | 11/2008 | Hirano et al. | |
| 2009/0097083 A1 | * | 4/2009 | Utsunomiya | ................. 358/518 |
| 2010/0182366 A1 | | 7/2010 | Takagi et al. | |
| 2010/0182367 A1 | | 7/2010 | Takagi et al. | |
| 2010/0207982 A1 | | 8/2010 | Satoh et al. | |
| 2010/0231631 A1 | | 9/2010 | Hosaka | |

FOREIGN PATENT DOCUMENTS

| | | |
|---|---|---|
| JP | 2003-189103 A | 7/2003 |
| JP | 2004-326613 A | 11/2004 |
| JP | 2005-219508 A | 8/2005 |
| JP | 2006-173929 A | 6/2006 |
| JP | 2008-143065 A | 6/2008 |

* cited by examiner

*Primary Examiner* — Twyler Haskins
*Assistant Examiner* — Michael Burleson
(74) *Attorney, Agent, or Firm* — Harness, Dickey & Pierce, P.L.C.

(57) ABSTRACT

An image processing apparatus includes: a color information acquiring unit that acquires color information of each scanning line of each head in a main scanning direction; and a correction unit that corrects a parameter used for a halftone process of a scanning line in the main scanning direction and a parameter used for a halftone process of an adjacent line adjacent to the scanning line, and, based on the acquired color information, corrects a difference in colors of the scanning line and the adjacent line.

19 Claims, 21 Drawing Sheets

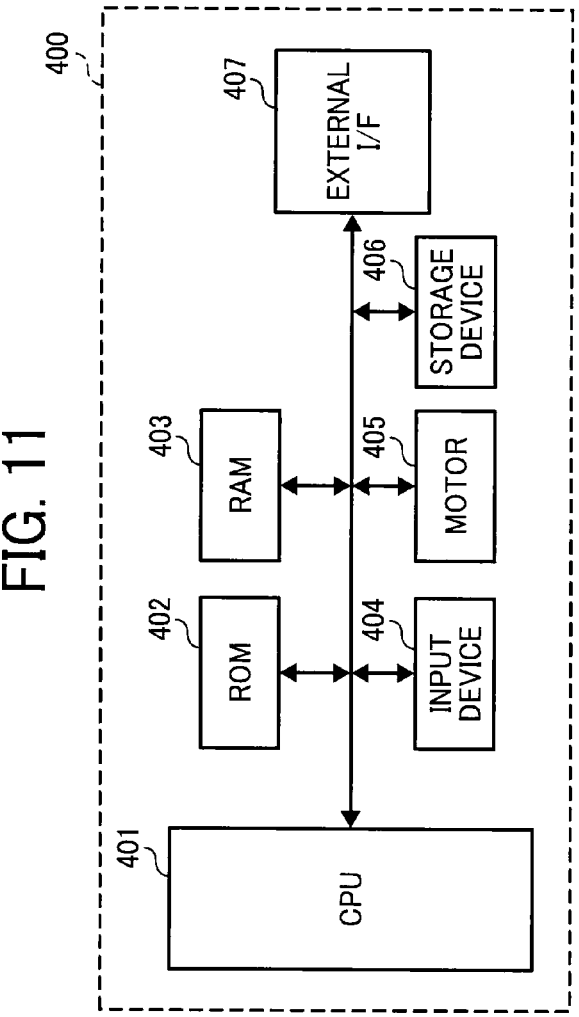
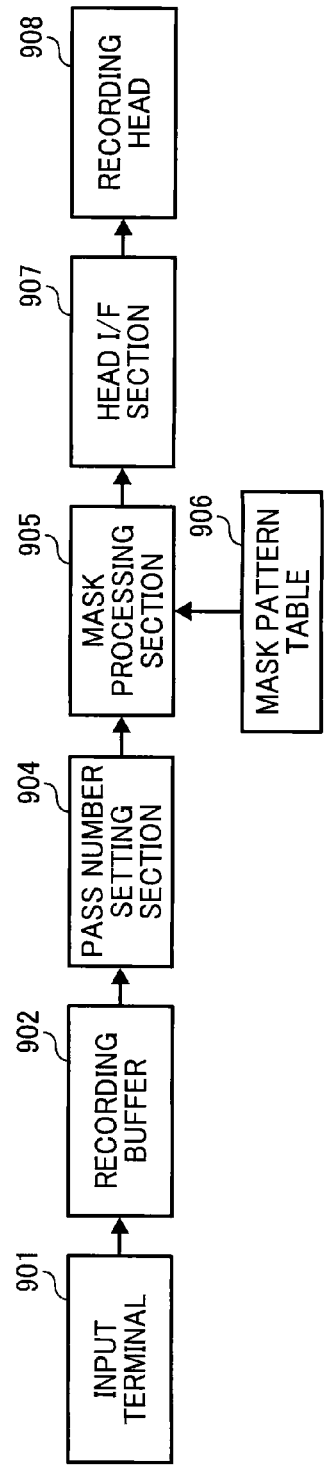

| $e_{00}$ | $e_{10}$ | $e_{20}$ | $e_{30}$ | $e_{40}$ | $e_{50}$ | $e_{60}$ |
|---|---|---|---|---|---|---|
| $e_{01}$ | $e_{11}$ | $e_{21}$ | $e_{31}$ | $e_{41}$ | $e_{51}$ | $e_{61}$ |
| $e_{02}$ | $e_{12}$ | $e_{22}$ | * | 100 | 240 | 70 |
| 13 | 48 | 150 | 129 | 98 | 180 | 4 |

$\frac{1}{48} \times$

| 1 | 3 | 5 | 3 | 1 |
|---|---|---|---|---|
| 3 | 5 | 7 | 5 | 3 |
| 5 | 7 | * | | |

~m1

CONVERT DIFFERENCE IN CHARACTERISTICS
(BRIGHTNESS) TO QUANTIZED LEVEL

FIG. 29

| 255 | 246 | 237 | 255 | 219 | 255 | | 255 | | 255 | 255 | 255 | 255 | 255 |
|-----|-----|-----|-----|-----|-----|---|-----|---|-----|-----|-----|-----|-----|
| 255 | 246 | 255 | 228 | 255 | 255 | | 255 | | 255 | 291 | 255 | 282 | 255 | 264 | 255 |
| 255 | 246 | 237 | 255 | 219 | 255 | | 255 | | 255 | 255 | 273 | 255 | 264 | 255 |
| 255 | 246 | 255 | 228 | 255 | 255 | | 255 | | 255 | 291 | 255 | 282 | 255 | 264 | 255 |
| 255 | 246 | 237 | 255 | 219 | 255 | | 255 | | 255 | 255 | 273 | 255 | 264 | 255 |
| 255 | 246 | 255 | 228 | 255 | 255 | | 255 | | 255 | 291 | 255 | 282 | 255 | 264 | 255 |
| 255 | 246 | 237 | 255 | 219 | 255 | | 255 | | 255 | 255 | 273 | 255 | 264 | 255 |

IMAGE PROCESSING APPARATUS, IMAGE FORMING APPARATUS, AND IMAGE PROCESSING METHOD

CROSS-REFERENCE TO RELATED APPLICATIONS

The present application claims priority to and incorporates by reference the entire contents of Japanese Patent Application No. 2009-282087 filed in Japan on Dec. 11, 2009 and Japanese Patent Application No. 2010-262221 filed in Japan on Nov. 25, 2010.

BACKGROUND OF THE INVENTION

1. Field of the Invention

The present invention relates to an image processing apparatus, an image forming apparatus, and an image processing method.

2. Description of the Related Art

Generally, in line ink jet recording apparatuses in which a plurality of head units is coupled to record image as much as an amount corresponding to the width of a sheet of paper by only an instance of scanning, or in serial ink jet recording apparatuses that form an image in the one-pass printing mode in which a head records image as much as an amount corresponding to the width of the head by only an instance of scanning, a variation in ejection characteristics of the heads sometimes causes degradation such as unevenness of an image.

Thus, Japanese Patent Application Laid-open No. 2005-219508 discloses a printer allowing an overlap in the main scanning line. However, when the amount of the overlap is very small, it is impossible to completely suppress appearing of the variation in characteristics. Meanwhile, when the amount of the overlap is large, the use efficiency of the head drops and the printing speed is lowered.

For such a reason, Japanese Patent Application Laid-open No. 2004-326613 discloses an image processing method of reducing the banding by changing the driving waveform of the head. In addition, Japanese Patent Application Laid-open No. 2003-189103 discloses an image forming apparatus in which an image of which density uniformity is corrected is produced by superimposing a signal for correcting the in-plane density unevenness on a halftone image.

However, when the printer disclosed in Japanese Patent Application Laid-open No. 2005-219508 is used to resolve the variation in characteristics of the heads, various driving waveforms are necessary. In addition, since the size or the shape of ink drops may vary inside a head, it is difficult to prepare all the driving waveforms in advance.

In addition, the gradation value changes when the image processing method disclosed in Japanese Patent Application Laid-open No. 2004-326613 is used so as to resolve the variation in characteristics of the heads. The change of the gradation value results in a change of a pattern of dot arrangement. Therefore, appears the discontinuity in pattern rather than the discontinuity in a color.

In addition, in order to solve the above-described problems, the present invention may be implemented as an image forming apparatus including the above-described image processing apparatus or an image processing method used in the above-described image processing apparatus.

SUMMARY OF THE INVENTION

It is an object of the present invention to at least partially solve the problems in the conventional technology.

According to an aspect of the present invention, there is provided an image processing apparatus comprising: a color information acquiring unit that acquires color information of each scanning line of each head in a main scanning direction; and a correction unit that corrects a parameter used for a halftone process of a scanning line in the main scanning direction and a parameter used for a halftone process of an adjacent line adjacent to the scanning line, and, based on the acquired color information, corrects a difference in colors of the scanning line and the adjacent line.

According to another aspect of the present invention, there is provided an image forming apparatus that forms an image by parallel scanning using a plurality of heads in a main scanning direction, or by scanning a plurality of lines using one head in the main scanning direction, wherein a difference in gradations of scanning lines in the main scanning direction is corrected by the image processing apparatus mentioned above.

According to still another aspect of the present invention, there is provided an image processing method comprising: acquiring color information of each scanning line of each head in a main scanning direction; and correcting a parameter used for a halftone process of a scanning line in the main scanning direction and a parameter used for a halftone process of an adjacent line adjacent to the scanning line, and based on the acquired color information, to correct a difference in colors of the scanning line and the adjacent line.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a diagram illustrating an example of the hardware structure of an image processing apparatus;

FIG. 12 is a block diagram schematically illustrating an image processing unit;

FIG. 29 is a diagram illustrating an example of a quantized reference value that is corrected by using Equation (4) or Equation (5).

DETAILED DESCRIPTION OF THE PREFERRED EMBODIMENTS

Hereinafter, embodiments of the present invention will be described with reference to the accompanying drawings. In the following embodiments, the "characteristic values" of a head include the amount of a discharged ink drop, the formed state of a dot (whether a single dot is formed, unintended dots called satellite dots due to scattering are formed, or the like), the precision of a dot landing position, and the like. These determine the characteristics such as density, brightness, and saturation of colors expressed by inks discharged from a head. Accordingly, although the same ink is used, if the characteristic values are different, a great variation in density in an output image appears and is recognized as color unevenness. Here, a "variation in characteristics" means a "variation in characteristic values."

In addition, the information of the characteristics such as the density, the brightness, and the saturation expressed by dots discharged from a head is referred to as "color information."

Embodiment

Hereinafter, an embodiment of the present invention will be described with reference to the drawings. In this embodiment, an ink jet printer will be described as an image forming apparatus. The ink jet printer according to this embodiment has a head that discharges inks of four colors KCMY, and image recording is performed in a manner such that the head reciprocates in a direction orthogonal to the conveying direction of a recording sheet.

Figure 1:
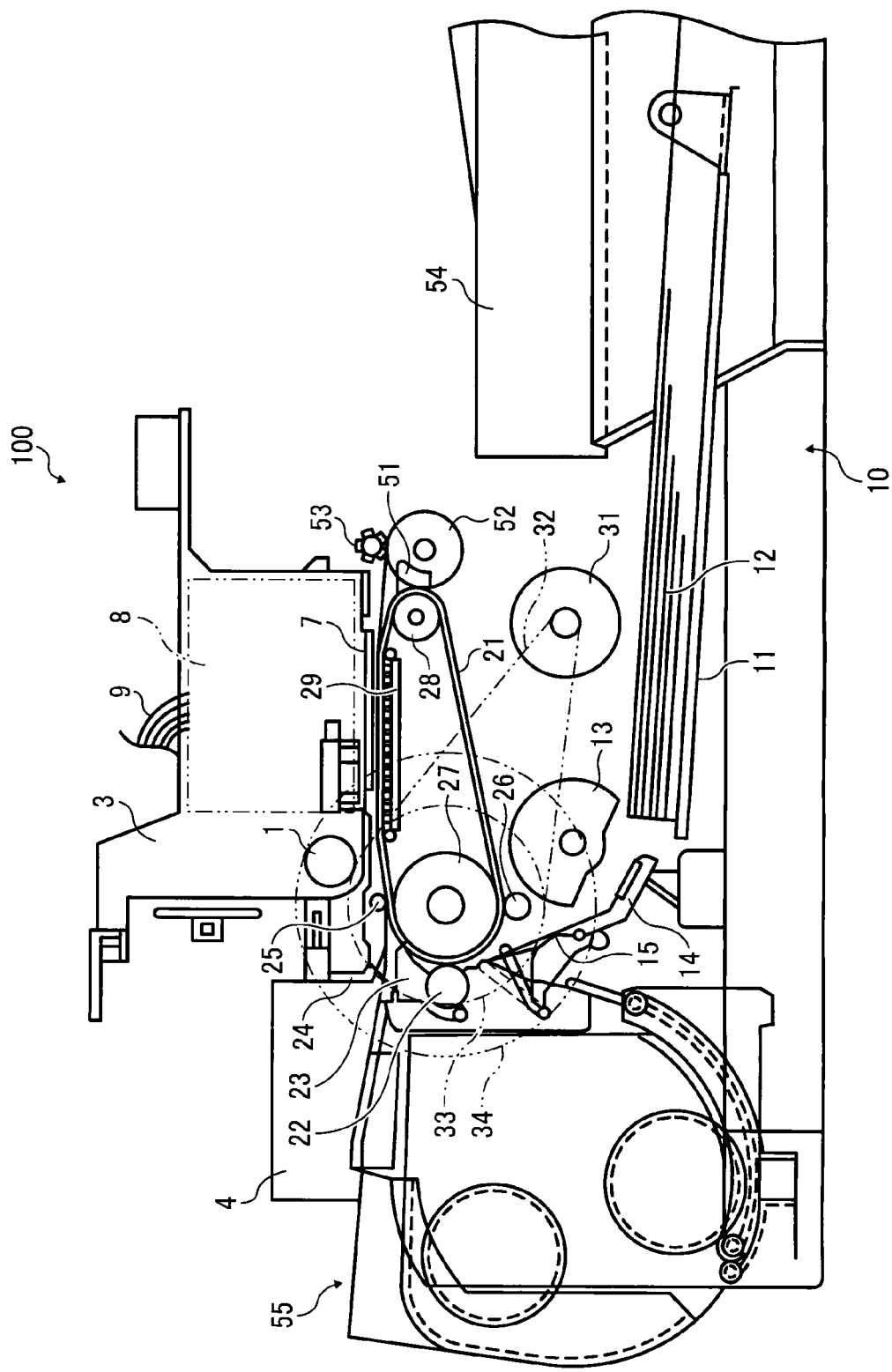
FIG. 1 is a schematic side view illustrating the entire structure of the mechanism of an image forming apparatus.
Figure 2:
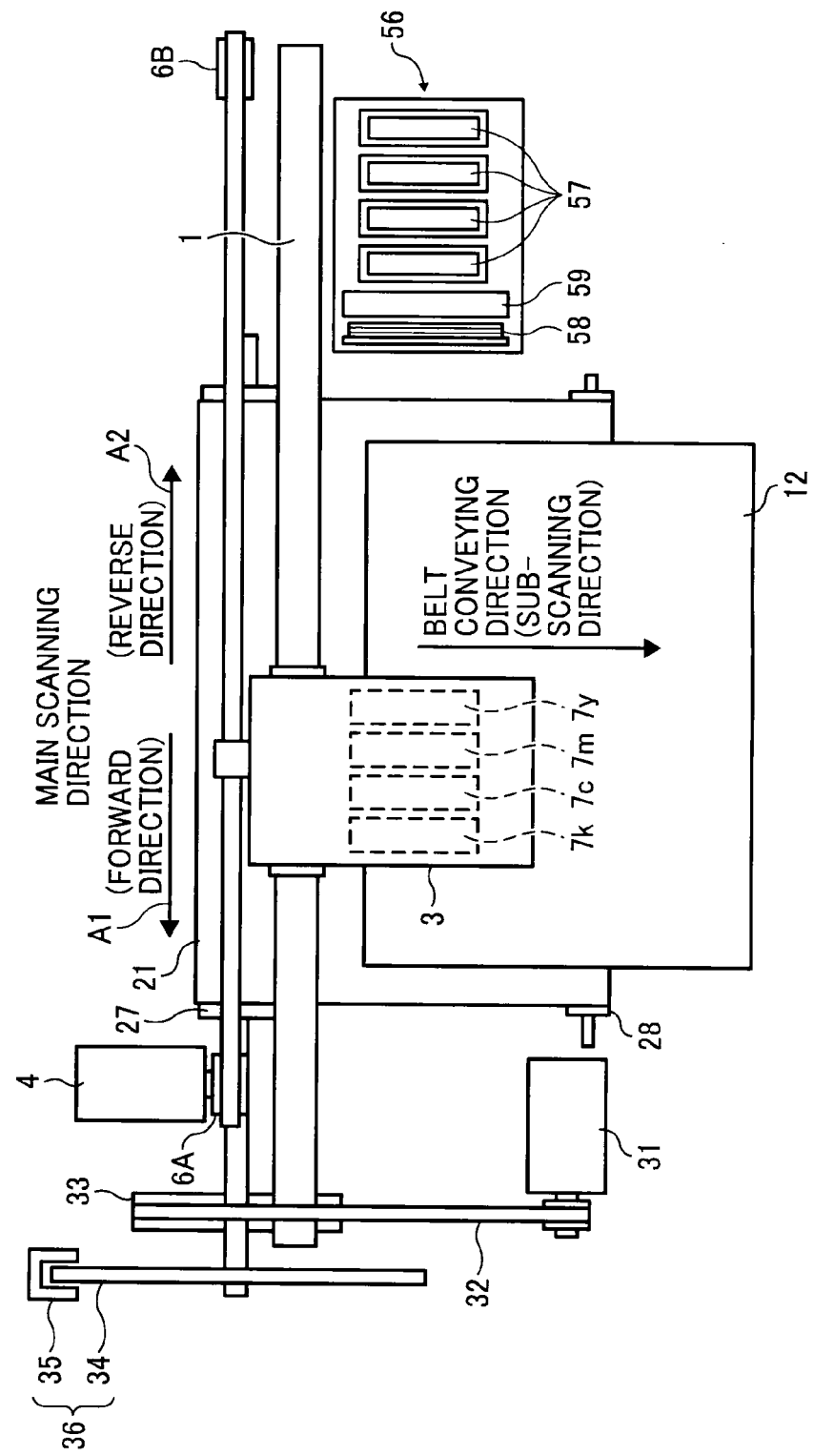
FIG. 2 is a schematic plan view illustrating the mechanism of the image forming apparatus.

FIGS. 1 to 6 are diagrams illustrating an image forming apparatus 100 as an ink jet printer. FIG. 1 is a schematic side view illustrating the entire structure of the mechanism of the image forming apparatus 100, and FIG. 2 is a schematic plan view illustrating the mechanism of the image forming apparatus 100.

The image forming apparatus 100 retains a carriage 3 in a slidable manner in a main scanning direction by the use of a guide rod 1 as a guide member that is laterally laid across left and right side plates which is not shown in the figure. It also scans by moving the carriage in the directions (main scanning direction) indicated by arrows A1 and A2 of FIG. 2 by a main scanning motor 4 via a timing belt stretched between a driving pulley 6A and a driven pulley 6B.

In this carriage 3, for example, four recording heads 7y, 7c, 7m, and 7k (hereinafter, when the colors do not need to be distinguished, it will be referred to as a "recording head 7") having liquid discharging heads that discharge drops of, for example, yellow (Y), cyan (C), magenta (M), and black (K) inks, respectively are installed in a manner such that a plurality of ink discharging openings is arranged in a direction intersecting the main scanning direction and the ink drop ejecting side thereof faces down.

As the liquid discharging head forming the recording head 7, a head can be used which includes, as a pressure generating unit for generating a pressure used to discharge a liquid drop, a piezoelectric actuator such as a piezoelectric element, a thermal actuator that utilizes a phase change attributable to film boiling of a liquid and using an electro-thermal conversion element such as a heating resistor, a shape memory metal alloy actuator utilizing a metallic phase change caused by a change in temperature, an electrostatic actuator utilizing an electrostatic force, or the like.

This embodiment is not limited to the structure having independent heads, each for one color but may employ a structure having one or a plurality of liquid discharging heads, each with a nozzle row that comprises a plurality of nozzles that discharge liquid drops of a plurality of colors. The carriage 3 is provided with sub tanks 8, each for one color, that are used to supply inks of respective colors to the recording heads 7. The inks are supplemented and supplied to the sub tanks 8 from main tanks (ink cartridges) not shown in figure through ink supplying tubes 9.

In addition, as a feed unit for feeding paper 12 loaded on a paper loading unit 11 (pressing plate) of a paper cassette 10 or the lie, there are provided a semicircular roller (paper feeding roller) 13 that separates and feeds paper sheets 12 one after another from a paper load unit 11 (pressing plate) and a separation pad 14 that faces the paper feeding roller 13 and is formed from a material having a high friction coefficient. The separation pad 14 is biased to the paper feeding roller 13 side.

In order to convey a paper sheet 12 fed from the paper feed unit below the recording head 7, there are provided a carriage belt 21 that is used to convey the paper sheet by electrostatic adsorption; a counter roller 22 that is used to convey the paper sheet 12 which is sent from the paper feed unit with an aid of a guide 15, in the state in which the paper sheet is interposed between the carriage belt 21 and the counter roller 22; a feed guide 23 that is used to change the direction of the paper sheet 12 which is sent to the upper side in an approximately vertical direction by an angle of 90 degrees so that the paper sheet 12 are placed on the carriage belt 21; and a pressing roller 25 that is biased to the carriage belt 21 side by a pressing member 24. In addition, a roller charging device 26 that is a charging unit for electrically charging the surface of the carriage belt 21 is included.

Here, the carriage belt 21 is an endless-type belt and is stretched between a carriage roller 27 and a tension roller 28. The carriage belt 21 is configured to rotate in the belt conveying direction (sub-scanning direction) shown in FIG. 2 when the carriage roller 27 is rotated by a sub-scanning motor 31 via a timing belt 32 and a timing roller 33. In addition, on the rear surface side of the carriage belt 21, a guide member 29 is disposed so as to correspond to an image forming area defined by the recording head 7. The roller charging device 26 is disposed in contact with the surface layer of the carriage belt 21 and is driven to rotate according to the rotation of the carriage belt 21.

As shown in FIG. 2, a slit disc 34 is attached to the shaft of the carriage roller 27, and a sensor 35 that detects a slit of the slit disc 34 is disposed. The slit disc 34 and the sensor 35 form a rotary encoder 36.

In addition, as a discharging unit for discharging the paper sheet 12 that was subjected to recording by the recording head 7, there are provided a separating claw 51 for separating the paper sheet 12 from the carriage belt 21; a discharging roller 52; a discharging roller 53; and a discharge tray 54 that stocks the discharged paper sheet 12.

In addition, onto the back, a duplex paper feed unit 55 is detachably attached. This duplex paper feed unit 55 takes in the paper sheet 12 returned owing to the reverse-direction rotation of the carriage belt 21; reverses the paper sheet; and feeds the paper sheet again between the counter roller 22 and the carriage belt 21.

As shown in FIG. 2, in a non-printing region located on one side of the carriage 3 in the scanning direction thereof, a maintenance and recovery mechanism 56 for maintaining and recovering the nozzle state of the recording head 7 is provided.

The maintenance and recovery mechanism 56 includes: caps 57 for capping nozzle faces of the recording heads 7; a wiper blade 58 as a blade member for wiping the nozzle faces; an idle discharge receiving unit 59 that receives liquid drops when an idle discharge is performed in which liquid drops that do not contribute to recording are discharged to discharge the recording liquid with an increased viscosity.

In the image forming apparatus configured as described above, the paper sheets 12 are separated and fed from the paper feed unit one after another; and the paper sheet 12 fed to the upper side in an approximately vertical direction is guided by the guide 15 and is conveyed in the state in which it is interposed between the carriage belt 21 and the counter roller 22. Then, the leading edge of the paper sheet 12 is guided by the feed guide 23 and pressed by the pressing roller 25 against the carriage belt 21. As a result, the conveying direction is changed by an angle of about 90 degrees.

At this time, an alternating voltage in which a positive voltage and a negative voltage are alternately and repeatedly applied from an AC bias supplying unit to the roller charging device 26 by a control unit not shown in the figure; and the carriage belt 21 is electrically charged in an alternating charging voltage pattern, that is, a pattern in which a positive voltage and a negative voltage are alternately repeated with a predetermined width in the sub-scanning direction that is the direction of rotation. When the paper sheet 12 is fed onto the charged carriage belt 21, the paper sheet 12 is adsorbed onto the carriage belt 21 due to an electrostatic force, and the paper sheet 12 is conveyed in the sub-scanning direction by the rotary motion of the carriage belt 21.

Then, by driving the recording head 7 in accordance with an image signal while moving the carriage 3 in the forward and reverse directions, ink drops are discharged onto the paper sheet 12 which is staying unmoving so as to record one line. Then, after the paper sheet 12 is conveyed by a predetermined amount, the next line is recorded. By receiving a recording end signal or a signal indicating that the rear end of the paper sheet 12 arrives at a recording region, the recording operation ends, and the paper sheet 12 is discharged to the discharge tray 54.

In addition, in the case of duplex printing, when the recording of the front surface (a surface that is printed first) ends, the carriage belt 21 is rotated in the reverse direction to send the paper sheet 12 on which the recording is performed once into the duplex paper feed unit 55. Thus, the paper sheet 12 is reversed (turns to the state so as for the rear surface to become the printing surface), and is fed between the counter roller 22 and the carriage belt 21. Then, timing control is performed such that the paper sheet 12 is conveyed onto the carriage belt 21, similarly to the case of the recording of the front surface; and recording of the rear surface is performed, followed by discharging of the paper sheet 12 to the discharge tray 54.

In addition, during standby for a printing (recording) process, the carriage 3 is moved to the maintenance and recovery mechanism 56 side; and the nozzle face of the recording head 7 is capped with the cap 57. Accordingly, the nozzles are kept moist, and thereby defective discharge due to dryness of link is prevented. In addition, the recording liquid is suctioned in the state in which the recording head 7 is capped with the cap 57; a recovery operation is performed to discharge the recording liquid with an increased viscosity or air bubbles; and a wiping process by the wiper blade 58 is performed to clean and eliminate the ink that adheres to the nozzle face of the recording head 7 due to the recovery operation. In addition, before starting the recording, performed is an idle discharge operation in which ink without being involved in the recording during the recording, or the like, is discharged. Accordingly, the recording head 7 can maintain stable discharge performance.

Figure 3:
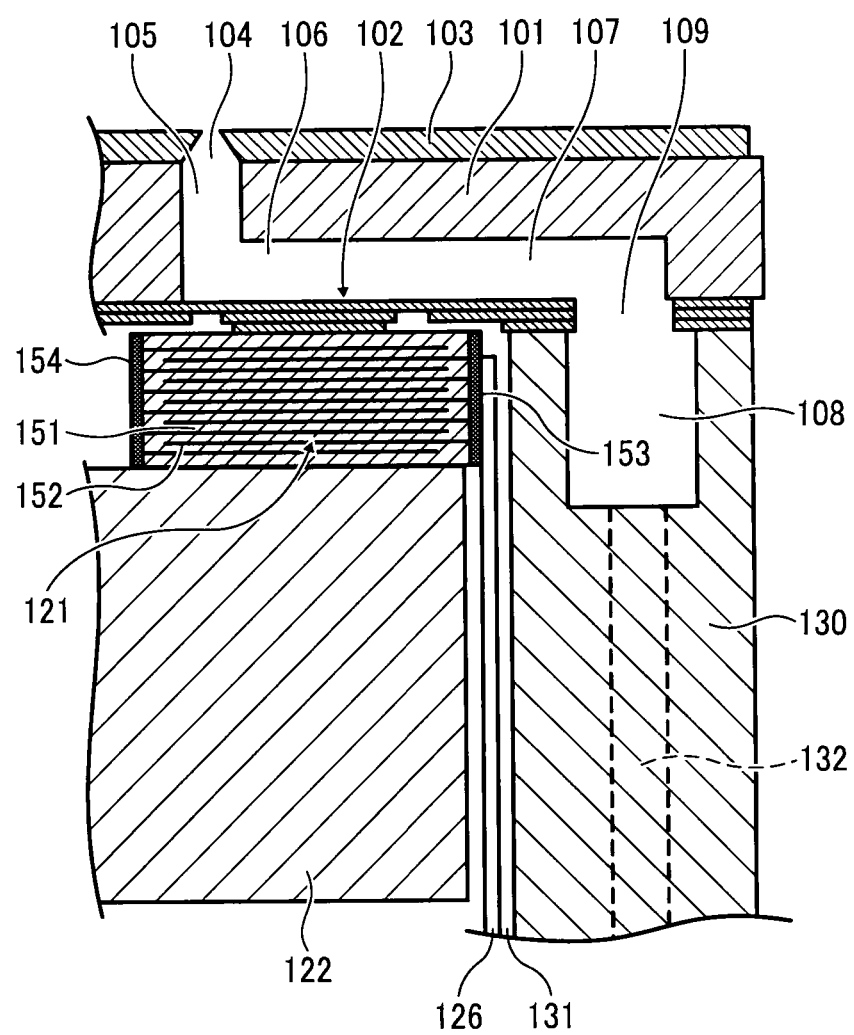
FIG. 3 is a schematic cross-sectional view taken along the longitudinal direction of a liquid chamber of a liquid discharging head.
Figure 4:
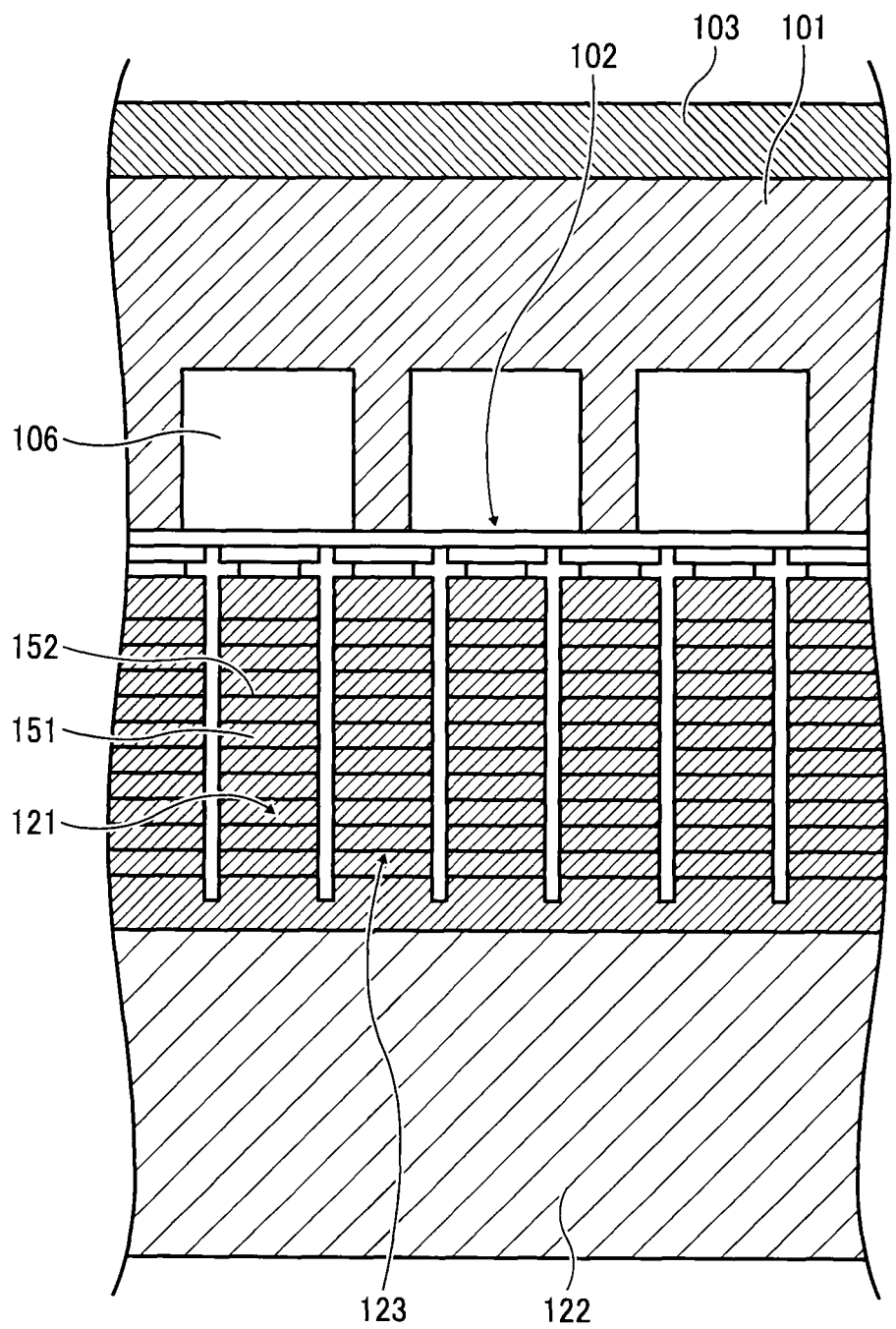
FIG. 4 is a schematic cross-sectional view taken along the shorter side direction (an arrangement direction of a nozzle) of the liquid chamber of the liquid discharging head.

FIGS. 3 and 4 are diagrams illustrating an example of a liquid discharging head that configures the recording head 7. FIG. 3 is a schematic cross-sectional view taken along the longitudinal direction of a liquid chamber of the head; and FIG. 4 is a schematic cross-sectional view taken along the shorter side direction (the arrangement direction of the nozzle) of the liquid chamber of the head.

This liquid discharging head is acquired by bonding and stacking a flow path plate 101, for example, that is formed by anisotropically etching a monocrystal silicon substrate; a vibration plate 102 that is bonded to the lower face of the flow path plate 101 and is, for example, formed through nickel electrocasting; and a nozzle plate 103 that is bonded to the surface of the flow path plate 101. By these plates, formed are a nozzle communication path 105 that is a flow path through which nozzles 104 discharging liquid drops (ink drops) communicate each other; a liquid chamber 106 that is a pressure generating chamber; an ink supply opening 109 that communicates with a common liquid chamber 108 used for supplying ink to the liquid chamber 106 through a fluid resistance unit (supply path) 107, and the like.

In addition, included are two columns (only one column is shown in FIG. 4) of lamination-type piezoelectric elements 121 as electromechanical conversion elements that are pressure generating unit (actuator means) used for pressurizing the ink inside the liquid chamber 106 by deforming the vibration plate 102; and a base substrate 122 that joins the piezoelectric elements 121 so as to be fixed. Furthermore, between the piezoelectric elements 121, pillar portions 123 are disposed. The pillar portions 123 are formed simultaneously with the piezoelectric elements 121 by dividing and processing of a piezoelectric element member. Since a driving voltage is not applied to the pillar portions 123, the pillar portions 123 are configured to be simple pillars.

In addition, an FPC cable 126 in which a driving circuit (driving IC) not shown in the figure is mounted is connected to the piezoelectric elements 121.

The peripheral edge portion of the vibration plate 102 is joined with a frame member 130. The frame member 130 has therein a penetration portion 131 in which an actuator unit configured by the piezoelectric element 121, the base substrate 122, and the like are housed; a concaved portion that becomes the common liquid chamber 108 is formed; and an ink supply hole 132 for supplying ink from the outside to the common liquid chamber 108 is formed. This frame member 130 is formed from a thermosetting resin such as an epoxy-based resin or polyphenylene sulfide through injection molding.

Here, in the flow path plate 101, a concave portion and a hole portion that become the nozzle communication path 105 and the liquid chamber 106 are formed by anisotropically etching a mono crystal silicon substrate, for example, having a crystal plane direction of (110) using an alkaline etching solution such as potassium hydroxide in aqueous solution (KOH). However, the forming of the flow path plate 101 is not limited to the use of the mono crystal silicon substrate, but stainless substrates, a photosensitive resin, and the like can be used.

The vibration plate 102 is formed from a nickel metal plate and is manufactured, for example, by using an electroforming method (electrocasting method). However, a metal plate, a member obtained by joining a metal with a resin plate, or the like can be used. The piezoelectric elements 121 and the pillar portion 123 are bonded to the vibration plate 102 using an adhesive agent, and the frame member 130 is further bonded thereto using an adhesive agent.

In the nozzle plate 103, nozzle 104 having a diameter of 10 to 30 μm is formed so as to correspond to the liquid chambers 106 respectively, and the nozzle plate 103 is bonded to the flow path plate 101 using an adhesive agent. This nozzle plate 103 is formed by forming a water-repellent layer on the outermost surface of the nozzle forming member, which is formed from a metal member, with necessary layers therebetween.

The piezoelectric element 121 is a lamination-type piezoelectric element (here, a PZT) in which piezoelectric materials 151 and internal electrodes 152 are alternately laminated. Individual electrodes 153 and a common electrode 154 are connected to the internal electrodes 152 that are alternately extending out at different end faces of the piezoelectric element 121. This embodiment employs a configuration in which ink inside the liquid chamber 106 is pressed by displacement in direction d33 as the piezoelectric direction of the piezoelectric element 121. However, a configuration in which ink inside the liquid chamber 106 is pressed by displacement in direction d31 as the piezoelectric direction of the piezoelectric element 121 may be used. Furthermore, a structure in which one column of the piezoelectric elements 121 is disposed on one base substrate 122 may be used.

In the liquid ejecting head configured as described above, the piezoelectric element 121 is contracted, for example, when a voltage applied to the piezoelectric element 121 drops from a reference electric potential. The vibration plate 102 is lowered and the volume of the liquid chamber 106 is increased, so ink comes to flow into the liquid chamber 106. Thereafter, the piezoelectric element 121 expands in the lamination direction when the voltage applied to the piezoelectric element 121 is increased; the vibration plate 102 deforms in the nozzle 104 direction so that the volume of the liquid chamber 106 decreases; and the recording liquid inside the liquid chamber 106 is pressed. As a result, drops of the recording liquid are discharged from the nozzle 104.

Then, by recovering the voltage applied to the piezoelectric element 121 up to the reference electric potential, the vibration plate 102 is restored to the initial position, and the liquid chamber 106 is expanded so as to generate negative pressure. Accordingly, at this time, the recording liquid flowing into from the common liquid chamber 108 fills the inside of the liquid chamber 106. After the vibration of the meniscus surface of the nozzle 104 is attenuated and the nozzle 104 is stabilized, the process proceeds to an operation for discharging a next liquid drop.

The method of driving the head is not limited to that represented in the example described above (pulling and pushing driving). Thus, pulling driving, pushing driving, or the like can be performed in accordance with how to apply driving waveform.

Next, the overview of the control unit of the image forming apparatus will be described with reference to a block diagram shown in FIG. 5.

A control unit 200 includes: a CPU 201 that is responsible for control of the entire apparatus; a ROM 202 that stores a program executed by the CPU 201 and other types of fixed data therein; a RAM 203 that temporarily stores image data or the like therein; a rewritable non-volatile memory 204 that is used for storing data while power of the apparatus is cut off; and an ASIC 205 that performs image processing such as various types of signal processing or rearrangement of image data, or processes an input/output signal that is used for controlling the entire apparatus.

In addition, the control unit 200 includes: a host I/F 206 that is used for transmitting or receiving data and signals to or from the host side; a print control section 207 that includes a data transmitting unit used for controlling driving of the recording head 7 and a driving waveform generating unit that generates a driving waveform; a head driver (driver IC) 208 for driving the recording head 7 disposed on the carriage 3 side; a motor driving section 210 for driving a main scanning motor 4 and a sub scanning motor 31; an AC bias supplying section 212 that supplies an AC bias to the roller charging device 26; an I/O 213 used in inputting detection signals transmitted from encoder sensors 43 and 35 and detection signals transmitted from various sensors such as a temperature sensor detecting the ambient temperature; and the like. In addition, an operation panel 214 used for input and display operations of information needed for this apparatus is connected to the control unit 200.

Here, the control unit 200 receives image data or the like that is transmitted from the host side such as an information processing apparatus including a personal computer or the like, an image scanning apparatus including an image scanner or the like, or an image capturing apparatus including a digital camera or the like through a cable or a network by using the host I/F 206.

Then, the CPU 201 of the control unit 200 reads out and analyzes print data stored in a reception buffer that is included in the host I/F 206; performs necessary image processing and rearrangement of data by using the ASIC 205; and transmits the image data from the print control section 207 to a head driver 208. The formation of dot pattern data that is used for outputting an image is performed by a printer driver of the host side to be described below.

The print control section 207 transmits the above-described image data as serial data to the head driver 208 and outputs a clock signal, a latch signal, a drop control signal (mask signal), and the like that are necessary for transmission of the image data, determination of the transmission, and the like to the head driver 208. In addition, the print control section 207 includes a driving waveform generating unit that is configured by a D/A converter performing D/A conversion for the pattern data of a driving signal stored in the ROM 202, a voltage amplifier, a current amplifier, and the like and a unit for selecting a driving waveform applied to the head driver 208, and generates a driving waveform that is configured by one driving pulse (driving signal) or a plurality of driving pulses (driving signals) and outputs the generated driving waveform to the head driver 208.

The head driver 208 drives the recording head 7 by selectively applying a driving signal configuring a driving waveform transmitted from the print control section 207 to a driving element (for example, the piezoelectric element 121 as described above) of the recording head 7 that generates energy for discharging liquid drops based on the image data as much as an amount corresponding to one line of the recording head 7 that is serially input. At this time, by selecting a driving pulse that forms the driving waveform, dots having different sizes such as a large drop (a large dot), a medium drop (a medium dot), or a small drop (a small dot) can be formed.

In addition, the CPU 201 calculates a driving output value (control value) for the main scanning motor 4 based on a speed detection value and a position detection value, which are acquired by sampling the detection pulse transmitted from the encoder sensor 43 forming a linear encoder, and a speed target value and a position target value that are acquired from a speed/position profile stored in advance so as to drive the main scanning motor 4 through the motor driving section 210. Similarly, the CPU 201 calculates a driving output value (control value) for the sub scanning motor 31 based on a speed detection value and a position detection value, which are acquired by sampling the detection pulse transmitted from the encoder sensor 35 forming a rotary encoder, and a speed target value and a position target value that are acquired from the speed/position profile stored in advance so as to drive the sub scanning motor 31 through the motor driving section 210.

Figure 6:
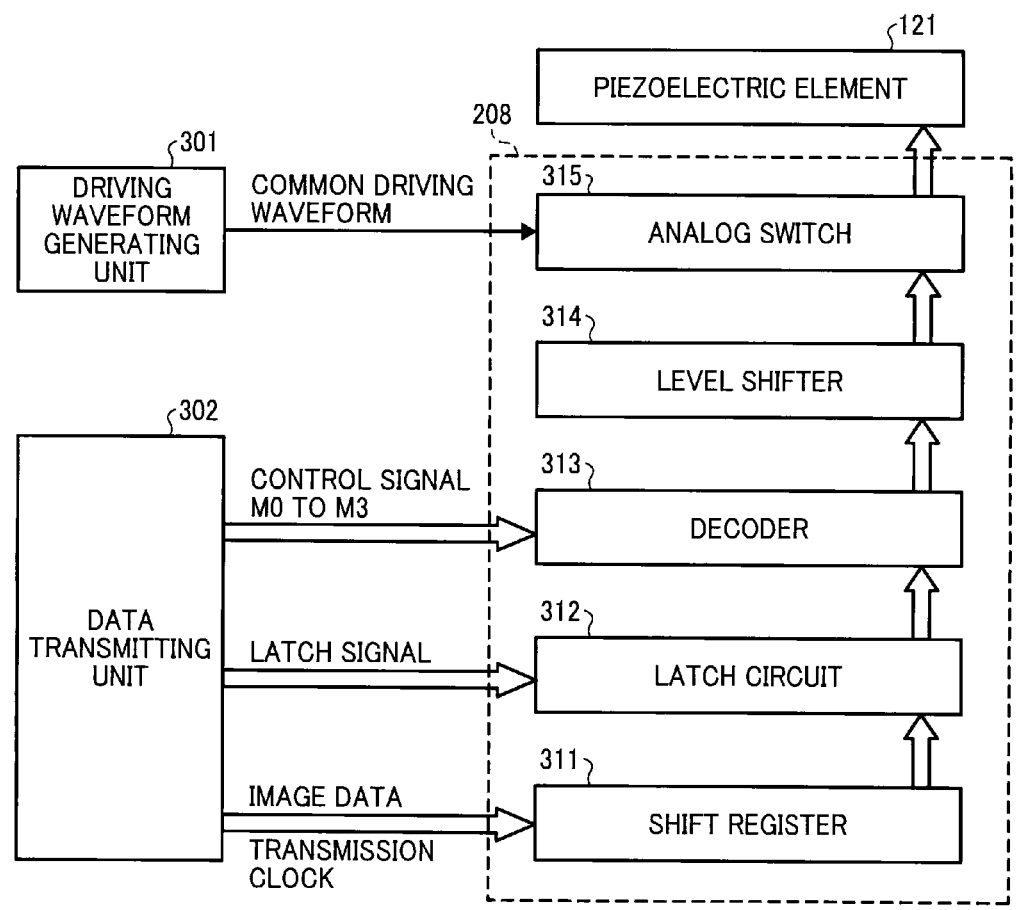
FIG. 6 is a diagram illustrating an example of a print control unit and a head driver.

FIG. 6 is a diagram illustrating an example of the print control section 207 and the head driver 208. The print control section 207, as described above, includes a driving waveform generating unit 301 that generates and outputs the driving waveform (common driving waveform) configured by a plurality of driving pulses (driving signals) within one printing period, and a data transmitting unit 302 that outputs image data (gradation signal 0 or 1), in which each item is consisted of two bits, corresponding to a print image, a clock signal, a latch signal (LAT), and a drop control signal M0 to M3.

In addition, the drop control signal is a 2-bit signal that instructs to open or close an analog switch 315 serving as a switching unit of the head driver 208, which will be described later, for each drop. It transits to the state of an H level (On) as a selected waveform in accordance with a printing period of the common driving waveform and transits to the state of an L level (Off) at the time of no selection.

The head driver 208 includes a shift register 311 that receives a transmission clock (shift clock) and serial image data (gradation data: 2 bits/CH) transmitted from the data transmitting unit 302 as an input; a latch circuit 312 that is used for latching each resister value of the shift register 311 using a latch signal; a decoder 313 that decodes the gradation data and the drop control signal M0 to M3 and outputs the result thereof; a level shifter 314 that shifts the level of a logic level of the voltage signal of the decoder 313 into a level with which the analog switch 315 can operate; and an analog switch 315 that is turned on or off (open or closed) in accordance with the output of the decoder 313 that is transmitted through the level shifter 314.

The analog switch 315 is connected to the common electrode 154 of the piezoelectric elements 121, and the common driving waveform transmitted from the driving waveform generating unit 301 is input thereto. Accordingly, as the analog switch 315 is turned on in accordance with the result of decoding the image data (the gradation data) transmitted in a serial mode and the drop control signal M0 to M3 that is performed by the decoder 313, a necessary driving signal forming the common driving waveform is transmitted (selected) so as to be applied to the piezoelectric element 121.

Figure 7:
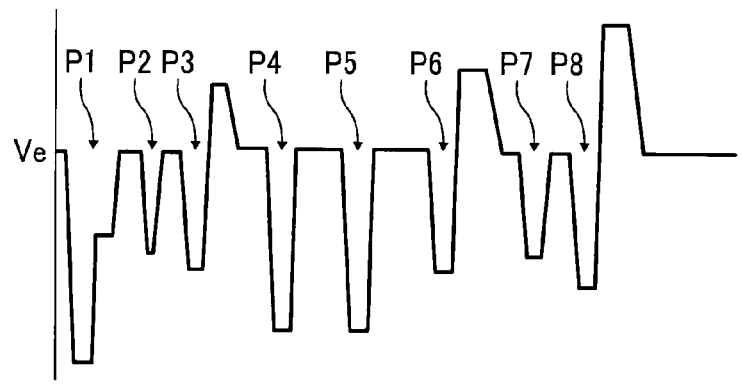
FIG. 7 is a diagram illustrating a waveform of a driving pulse that is generated by a driving waveform generating unit.

Next, an example of the driving waveform will be described with reference to FIGS. 7 and 8. FIG. 7 is the waveform of a driving pulse that is generated by the driving waveform generating unit 301. The driving waveform generating unit 301 produces a driving signal (driving waveform) consisting of eight driving pulses P1 to P8, each comprising a waveform element that falls from the reference potential Ve and a waveform element that rises after the falling, within one printing period (one driving period). On the other hand, a driving pulse to be used is selected in accordance with the drop control signal M0 to M3 transmitted from the data transmitting unit 302.

Here, the waveform element in which the electric potential V of the driving pulse falls from the reference electric potential Ve is a pulling waveform element that causes contraction of the piezoelectric element 121 to increase the volume of the liquid chamber 106. On the other hand, the waveform element that rises after the falling is a pressing waveform element that causes the expansion of the piezoelectric element 121 to decrease the volume of the liquid chamber 106.

Figure 8:
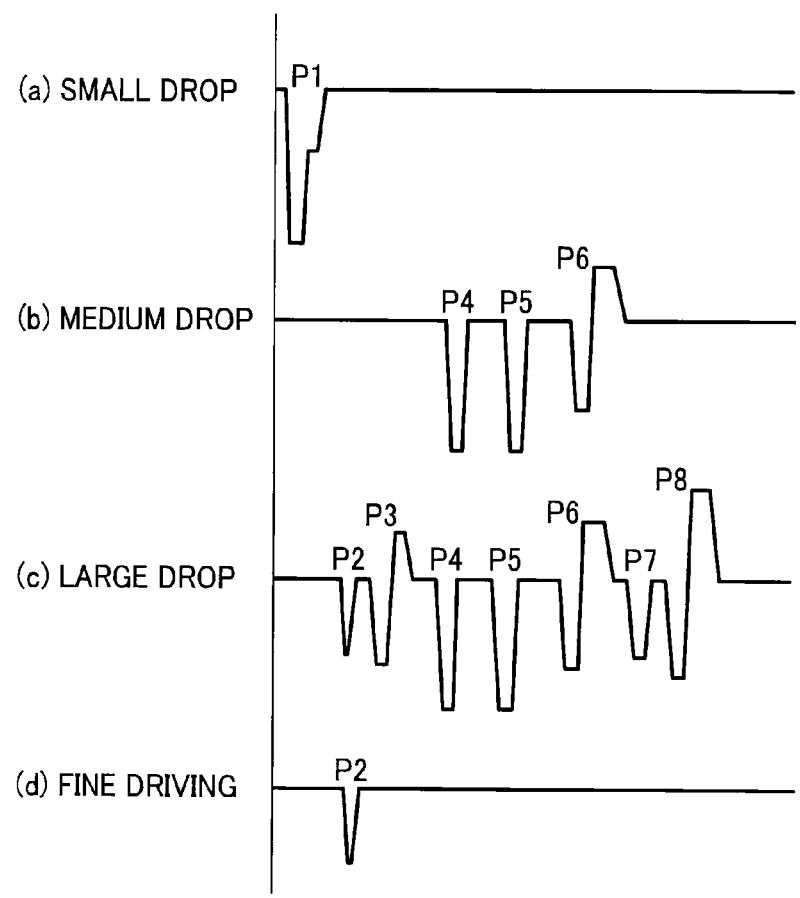
FIG. 8 is a diagram showing driving pulses for each size of a liquid drop.

FIG. 8 is a diagram showing the driving pulses for a small drop (small dot), a medium drop (medium dot), a large drop (large dot), and fine driving. In accordance with the drop control signals M0 to M3 transmitted from the data transmitting unit 302, when forming a small dot, as shown (a) in FIG. 8, the driving pulse P1 is selected, when forming a medium dot, as shown in (b) FIG. 8, driving pulses P4 to P6 are selected, when forming a large dot, as shown in (c) FIG. 8, driving pulses P2 to P8 are selected, and when performing the fine driving (the meniscus is vibrated without causing ejection of drops), as shown in (d) FIG. 8, the driving pulse P2 that is a fine, driving pulse is selected. The selected driving pulse is applied to the piezoelectric element 121 of the recording head 7.

When forming a medium dot, the first drop is discharged with the driving pulse P4, the second drop is discharged with the driving pulse P5, and the third drop is discharged with the driving pulse P6. The drops are integrated together in the middle of flight, so they are landed as one drop. At this time, provided that the natural vibration period of the pressure chamber (the liquid chamber 106) is Tc, it is preferable that the interval between discharge timings of the driving pulses P4 and P5 is 2Tc±0.5 μs. The driving pulses P4 and P5 are configured with simple pulling waveform elements. Thus, when the driving pulse P6 is formed with a simple pulling waveform element, the velocity of the ink drop becomes too high, so that there is a concern that the ink drops may be deviated from the landing positions of other types of drops. Accordingly, by decreasing the pull-in voltage (decreasing the falling electric potential) of the driving pulse P6, the pulling width of the meniscus is decreased, and thereby the velocity of the ink drop of the third drop is suppressed. However, in order to obtain a necessary volume of an ink drop, a start voltage is not set as lowered.

In other words, by relatively decreasing the pull-in voltage in the pulling waveform element of the last driving pulse out of a plurality of driving pulses, the discharge speed of the drop that is defined by the last driving pulse is relatively decreased, and accordingly, the landing position may match with those of other types of drops. Here, the driving pulse P2 is a driving pulse that causes vibration of the meniscus without discharging ink drops to prevent the dryness of the meniscus of the nozzle. In a non-printing region, the driving pulse P2 is applied to the recording head 7. In addition, by using the driving pulse P2 that is the fine driving pulse as one of driving pulses for forming a large drop, the driving period can be shortened (driving can be performed at high speed).

In addition, by setting the interval between the discharge timings of the driving pulses P2 and P3 within the range of "natural vibration period Tc±0.5 µs," the volume of the ink drop that is discharged by the driving pulse P3 can be achieved. In other words, by superimposing expansion of the liquid chamber 106 caused by the driving pulse P3 on the pressure vibration of the liquid chamber 106 in accordance with the period of the vibration caused by the driving pulse P2, the volume of the drop that can be discharged by the driving pulse P3 can be increased to be larger than that of the case in which the driving pulse P3 is applied alone.

Figure 9:
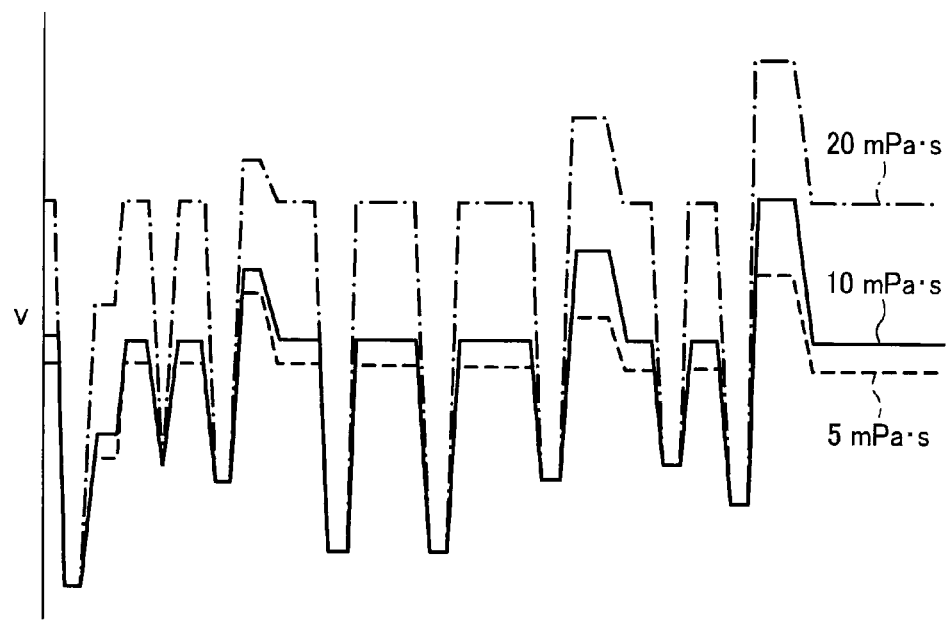
FIG. 9 is a diagram showing a driving waveform for each viscosity of ink.

The necessary driving waveform differs in accordance with the viscosity of the ink. Thus, in this image forming apparatus, as shown in FIG. 9, a driving waveform at the time of ink viscosity of 5 mPa·s, a driving waveform at the time of ink viscosity of 10 mPa·s, and a driving waveform at the time of ink viscosity of 20 mPa·s are prepared. Then, the ink viscosity is determined based on the detection temperature that is detected by the temperature sensor, and a driving waveform to be used is selected.

In other words, by relatively decreasing the voltage of the driving pulse in a case where the ink viscosity is low; and relatively increasing the voltage of the driving pulse in a case where the ink viscosity is high, ink drops can be discharged such that the speed and the volume of the ink drops are approximately constant without depending on the ink viscosity (temperature). In addition, by selecting the crest value of the driving pulse P2 in accordance with the ink viscosity, the meniscus can be vibrated without discharging any ink drop.

By using a driving waveform that is configured by the above-described driving pulses, the time for a large drop, a medium drop, and a small drop to land onto the paper sheet 12 can be controlled. Accordingly, even when the time for starting discharge is different for each of the large drop, the medium drop, and the small drop, the drops can be landed at the almost same position.

Next, an image processing apparatus and an image forming apparatus that perform the image processing method according to this embodiment will be described as below. The image processing method according to this embodiment, for example, may be performed by executing a program by using a computer.

Figure 10:
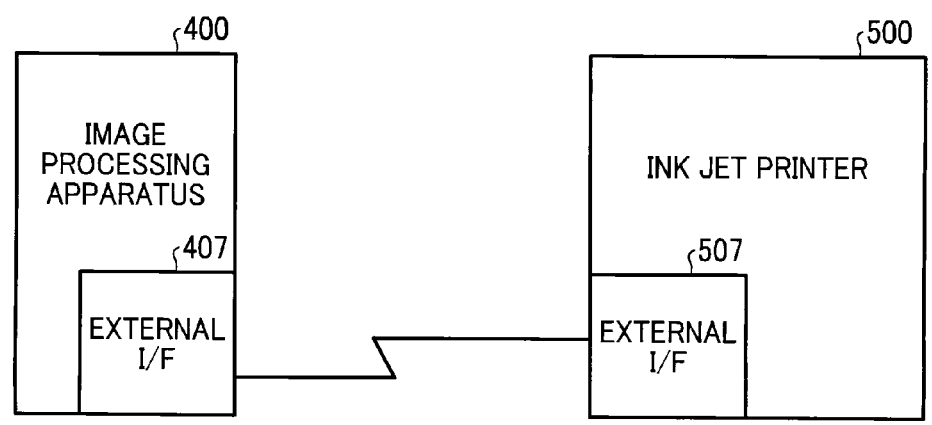
FIG. 10 is a schematic diagram illustrating an image forming system that includes an image processing apparatus and an ink jet printer.

FIG. 10 is a schematic diagram illustrating an example of an image forming system that is configured by an image processing apparatus and an ink jet printer (an ink jet recording apparatus) that is the above-described image forming apparatus.

This printing system (image forming system) is configured by connecting one or a plurality of image processing apparatuses 400 that is configured by a personal computer (PC) or the like and an ink jet printer 500 through predetermined interfaces (an external I/F 407 and an external I/F 507) or a network. The image processing apparatus 400 is a host computer of the ink jet printer 500.

In the image processing apparatus 400, as shown in FIG. 11, a CPU 401 and various types of a ROM 402 and a RAM 403 as a memory means are connected through a bus line. To this bus line, through a predetermined interface, a storage device 406 that uses a magnetic storage device such as a hard disk, an input device 404 such as a mouse or a keyboard, a monitor 405 such as an LCD or a CRT, and a memory medium reading device that reads out a memory medium such as an optical disc, although not shown in the figure, are connected. In addition, a predetermined interface (external I/F) 407 that communicates with a network such as the Internet or an external device such as a USB is connected to the bus line.

In the storage device 406 of the image processing apparatus 400, an image processing program that includes a program according to this embodiment is stored. This image processing program is installed to the storage device 406 by being read out from a memory medium by a memory medium reading device, downloaded from a network such as the Internet, or the like. Through this installation, the image processing apparatus 400 is in an operable state for performing image processing as below. The image processing program may operate on a predetermined OS. In addition, the image processing program may form a part of specific application software.

The image processing method according to this embodiment may be performed on the ink jet printer side. Here, an example will be described in which the ink jet recording apparatus side does not have a function for receiving a drawing command of an image or a print command of texts inside the apparatus and for generating a dot pattern to be actually recorded. In other words, an example will be described in which a print command in application software executed by the image processing apparatus 400 serving as a host is image-processed by using a printer driver, which is embedded inside the image processing apparatus 400 as software, according to an embodiment of the present invention; data (print image data) of a dot pattern having multiple values that can be printed by the ink jet printer 500 is generated; the data is rasterized and transmitted to the ink jet printer 500; and the data is printed out by the ink jet printer 500.

More specifically, inside the image processing apparatus 400, a drawing command of an image or a recording command of a text (for example, a command describing the position, the thickness, the form, and the like of a line to be recorded; or a command describing the font, the size, the position, and the like of the text to be recorded) transmitted from an application or an operating system is temporarily stored in a drawing data memory. Such a command is described in a specific printing language.

Then, the command stored in the drawing data memory is analyzed by a rasterizer. When the command is a command for recording a line, the command is converted into a recording dot pattern according to the position, the thickness, and the like that are designated. When the command is a command for recording a text, contour information of the text corresponding to the font outline data that is stored in the image processing apparatus 400 is called and is converted into a recording dot pattern according to the position and the size that are designated. On the other hand, in the case of image data, the image data is directly converted into a pattern or recording dots.

Thereafter, image processing is performed for the recording dot pattern (image data) and is stored in the raster data memory. At this time, the image processing apparatus 400 rasterizes into data of a recording dot pattern by using an orthogonal grid as a basic recording position. As examples of the image processing, there are a color managing process (CMM) and a γ correction process that are used for adjusting the color, halftone processing such as a dithering method or an error diffusion method, basic elimination processing, and an ink total amount regulating process. Then, the recording dot pattern stored in the raster data memory is transmitted to the ink jet printer 500 through an interface.

In the recording apparatus according to this embodiment, as a recording method, so-called one pass printing in which an image is formed by performing main scanning once for a recording medium may be used; or so-called multi-pass printing in which an image is formed by performing main scanning several times by using a same nozzle group or different nozzle groups for the same area of the recording medium may be used. In addition, the same area may be divided for different nozzles by aligning the heads in the main scanning direction. Such recording methods may be appropriately combined and used.

Next, the multi-pass printing will be described. Here, an example will be described in which an image is competed by performing main recording scanning (four passes) four times for one recording area.

FIG. 12 is a block diagram schematically showing an image processing unit according to this embodiment. In the figure, reference numeral 901 denotes an input terminal, reference numeral 902 denotes a recording buffer, reference numeral 904 denotes a pass number setting section, reference numeral 905 denotes a mask processing section, reference numeral 906 denotes a mask pattern table, reference numeral 907 denotes a head I/F section, and reference numeral 908 denotes a recording head.

Bit map data input from the input terminal 901 is stored at a predetermined address of the recording buffer 902 by a recording buffer control section. The recording buffer 902 has capacity for storing the bit map data corresponding to the amount of sheet conveyance of one scan and configures a ring buffer in units of the amount of sheet conveyance like an FIFO memory. When the bit map data corresponding to one scan is stored in the recording buffer 902 by controlling the recording buffer 902, the recording buffer control section starts the operation of a printer engine, reads out bit map data from the recording buffer 902 in accordance with the position of each nozzle of the recording head 908, and inputs the bit map data to the pass number setting section 904. In addition, when bit map data of the next scan is input from the input terminal 901, the recoding buffer control section controls the recording buffer 902 so as to store the bit map data in a vacant area (an area corresponding to the amount of sheet conveyance for which recording has been completed) of the recording buffer 902.

Next, a more specific configuration example in which the pass number setting section 904 of the image processing unit is used will be described. The pass number setting section 904 determines the number of divided passes and outputs the number of the passes to a mask processing section 905. In the mask pattern table 906, a necessary mask pattern according to the determined number of the divided passes is selected from the mask pattern table stored in advance, for example, out of mask patterns of one-pass recording, two-pass recording, four-pass recording, and eight-pass recording, and the selected mask pattern is output to the mask processing section 905. When the mask processing section 905 masks the bit map data stored in the recording buffer 902 by using the mask pattern for each pass recording and outputs the masked bit map data to the head driver, the head driver rearranges the masked bit map data in the order of being used by the recording head 908 and transmits the masked bit map data to the recording head 908.

As above, by using the multi-pass printing, bandings that are visually distinguished during the one pass printing are averaged so as not to be visually distinguished.

However, the multi-pass printing necessarily requires more scans for completing an image. Thus, according to the multi-pass printing, the image quality is high, but the productivity is low. Thus, as a means for improving the image quality in performing particularly one pass printing, there is an overlap processing technology.

The overlap processing technology is a technique in which color unevenness at a joint, at which particularly banding becomes a problem, is gradated by forming an image by overlapping the nozzles located on the end portions for the joint of scans or heads. There are various types of the overlap processing technology proposed.

Hereinafter, an example of the overlap process will be represented. For the serial printer described above, the example will be an example of a case where the overlap processing is applied to scanning joints. The basic principle is the same for a joint portion of heads of an image forming apparatus of the type in which a plurality of heads is connected, which will be described later. Thus, in the description below, they are not differentiated so as to be denoted by a joint unless otherwise mentioned (overlap of scans may be considered by substituting a head with scan). An image forming apparatus having a head joint portion will be described later.

Figure 13A:
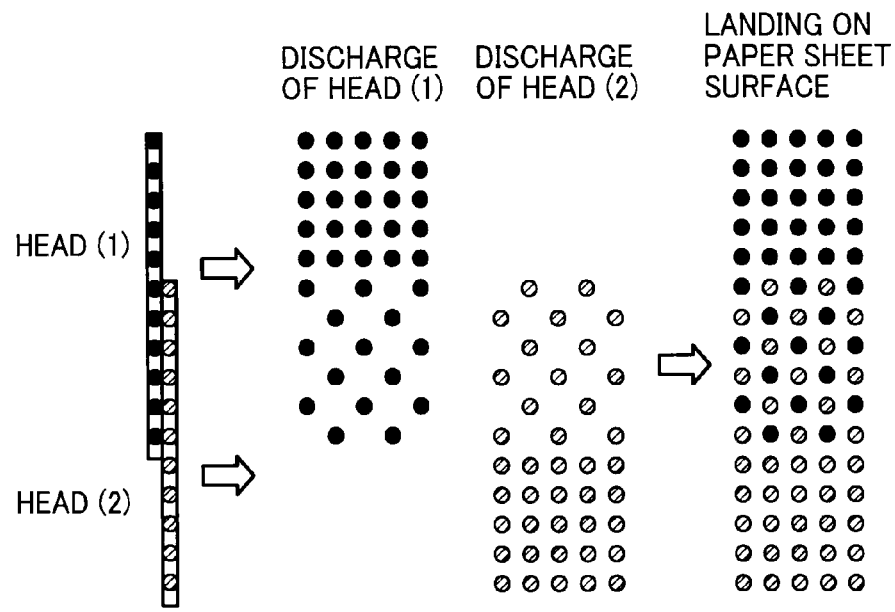
FIGS. 13A to 13D are diagrams illustrating an example of overlaps.
Figure 13B:
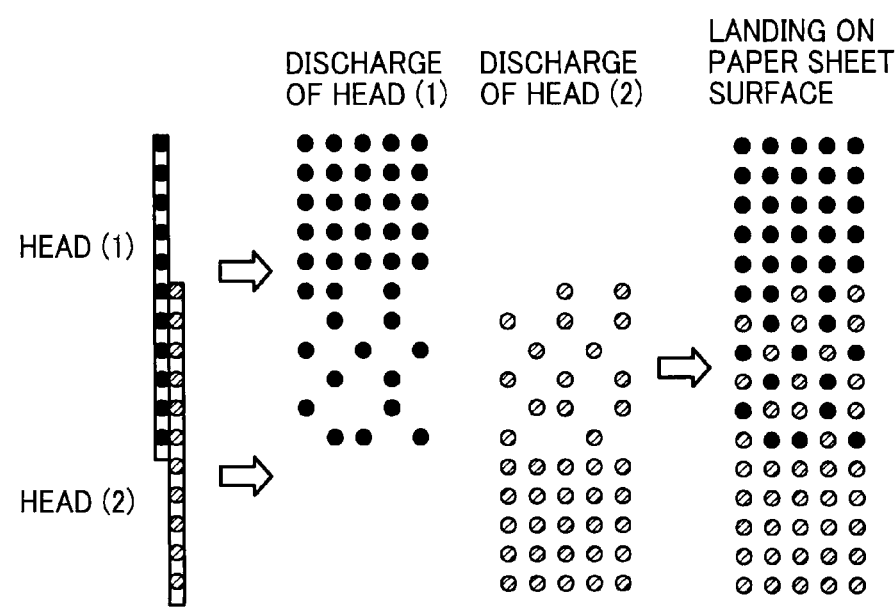
Figure 13C:
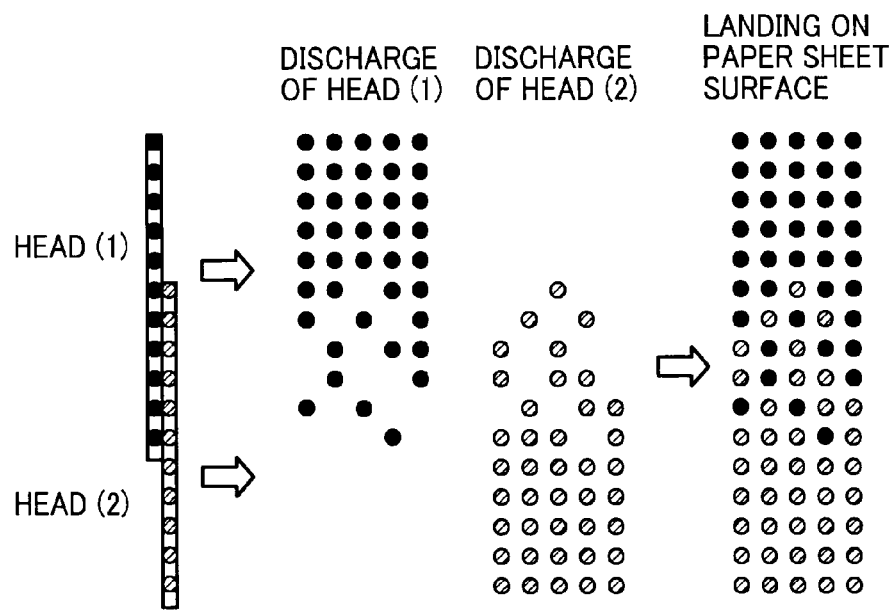
Figure 13D:
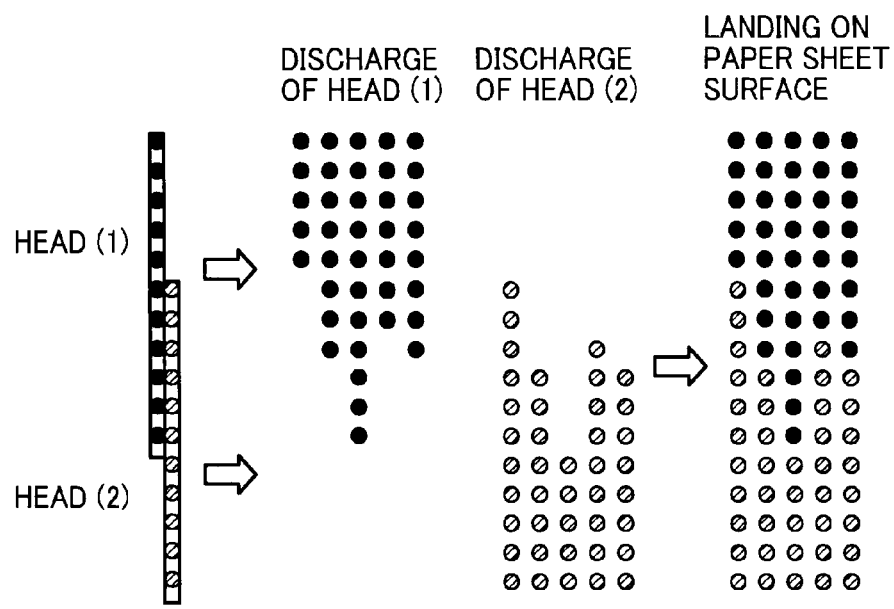

FIGS. 13A to 13D are diagrams representing examples of an overlap. FIG. 13A is an example in which dots located in an overlapping portion are assigned to overlapping nozzles in a zigzag pattern or the like. FIG. 13B is an example in which the dots located in the overlapped portion are randomly assigned. FIGS. 13C and 13D are examples in which dots are divided such that the recording rate of dots decreases toward the end portion of the head.

Figure 14:
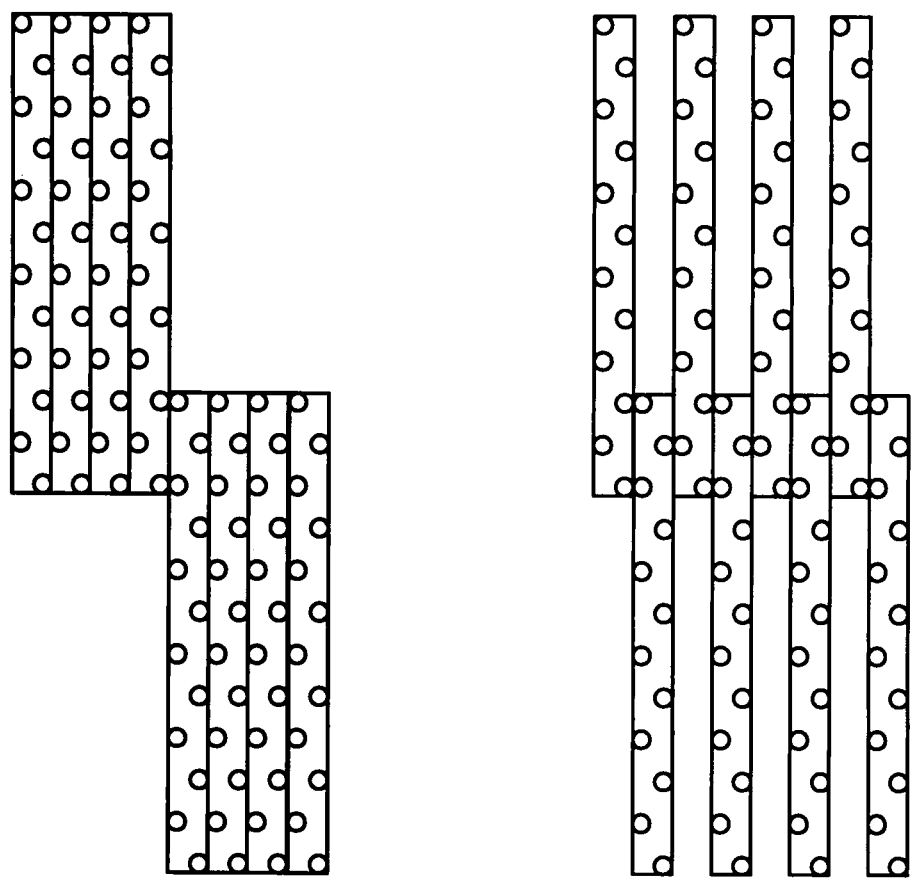
FIG. 14 is a diagram showing an example of connected heads.

As an ink jet printer that is different from that for which the overlap process is performed, there is a serial-type ink jet printer having connected heads. FIG. 14 is a diagram representing an example of the connected heads. By connecting the heads in the nozzle row direction as shown in FIG. 14, a lengthened ink jet head unit is moved in a direction orthogonal to the paper conveying direction, and thereby an image is formed.

In order to improve the printing speed, it is effective to increase the printing region near one scan. However, in order to increase the length of the head as a single body, there is a technical difficulty. In addition, in the case of high-volume production, even when there is a nozzle defect at least in one nozzle, the head becomes a defective product, and thereby the yield ratio decreases.

Accordingly, by connecting short heads, the head unit can be effectively lengthened. At this time, there is a problem in that banding due to the precision of assembly of heads, a difference between characteristics of the heads, or the like occurs in a joint portion of the heads in addition to the scanning joint, which is similar to the case of scanning.

Accordingly, by applying the overlap process to the head joint as well, the banding can be effectively decreased. While this apparatus has joint spots in both the scanning joint portion and the connected portion of the heads, the processes applied thereto may be different from each other, or the same process may be applied thereto.

Figure 15:
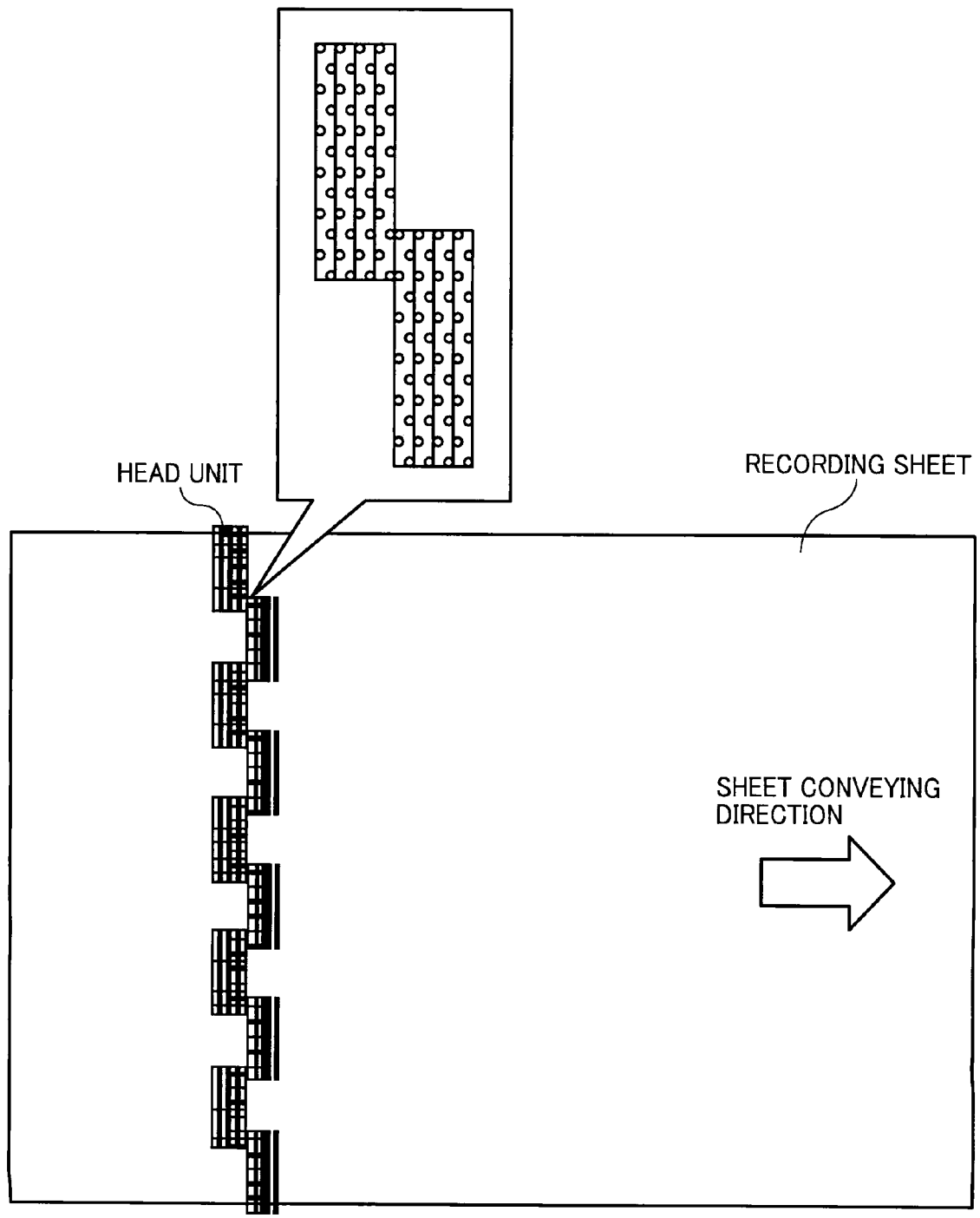
FIG. 15 is a diagram showing a head unit of a line-type ink jet printer.

FIG. 15 is a diagram showing a head unit of a line-type ink jet printer. In the line type, a head unit that reaches almost the paper sheet width as shown in FIG. 15 is included, and an image is formed by conveying a paper sheet in a direction orthogonal to the longitudinal direction of the head. Since this apparatus can form an image in the entire area of the paper sheet width by performing an operation through the paper sheet once, the productivity is very high.

However, in a case such an apparatus is realized, similarly to above-described embodiment of the connected head, the long head unit is frequently realized by connecting a plurality of heads, and accordingly, the occurrence of banding due to a difference in the characteristics of individual heads or the positional precision in assembly or the like becomes a key problem. In addition, by forming an image by disposing the head so as to be fixed, basically one-pass image forming is performed. Accordingly, there is a problem in that it is difficult to include a multi-pass mode as a higher image-quality mode.

Therefore, also in such an apparatus, as a banding improvement technology, an overlap process of a head joint portion is important.

However, in the overlap process, the number of substantially effective nozzles is calculated to be decreased as much as the number of overlapping nozzles. As the amount of overlapping increases, the overlapping pattern can be formed to be more complicated, and accordingly, the discontinuity of the joint portion can be formed to be more natural so as not to be visually distinguished. However, in such a case, the number of nozzles that are effectively used decreases. Thus, according to the one pass recording method, the recording area per scanning once decreases, and thereby the throughput decreases. In the line type, this means that the head size per head decreases, and more heads are necessary, and thereby there is a problem in that the cost increases. Therefore, in a practical application, the amount of overlapping is not that much.

In addition, in a case where a difference in the characteristics of connected heads or a difference in the characteristics within the head in the case of one-pass recording type is large, the characteristic difference cannot be completed resolved by performing only the overlap process.

Since the above-described overlap process is a technology for enhancing the discontinuity of the connected portion, color unevenness having a color difference ΔE<about 2.0 can be formed so as to be not visually distinguished to some degree. However, unevenness corresponding to a more color difference cannot be absorbed by using a small overlapping area.

Thus, according to this embodiment of the present invention, in addition to the overlap process, the difference in the characteristics of heads is absorbed by performing a correction process for an area that is larger than the overlapping area.

As a specific correction method, the density of output dots is adjusted by changing parameters of the error diffusion process in accordance with the difference in the characteristics of the heads. In the case of an ink jet recording apparatus that can use multiple levels of dot sizes or dots having different densities, the combination and the density of dots are adjusted.

Figures 16A, 16B, 16C:
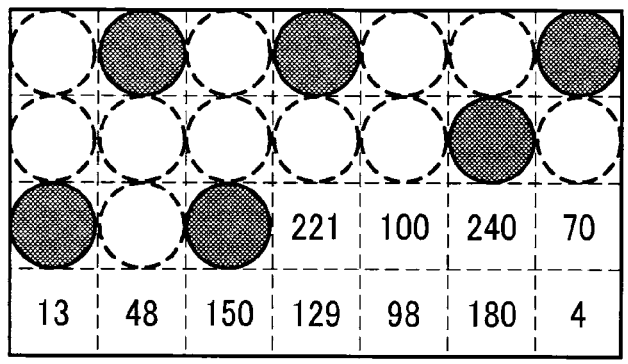
FIG. 16A is a diagram (first diagram) illustrating an error diffusion process.
FIG. 16B is a diagram (second diagram) illustrating the error diffusion process.
FIG. 16C is a diagram (third diagram) illustrating the error diffusion process.

FIGS. 16A to 16C are schematic diagrams illustrating an error diffusion process. In the error diffusion process, for example, a process is performed for each pixel in the order of rasterizing the image data. In the error diffusion process, the gradation value of a target pixel and a threshold value are compared with each other, and it is determined whether a dot is to be formed at a predetermined pixel position. Thereafter, an error between the threshold value and the gradation value is used for determining whether a dot is to be formed at the next pixel position and positions thereafter.

FIG. 16A is a diagram showing pixel positions at which whether or not a dot is determined to be formed by the error diffusion process and the gradation values of pixels that have not been processed. In FIG. 16A, a black circle is a pixel position at which a dot is determined to be formed by the error diffusion process, and a circle represented in a broken line is a pixel position at which dot formation is determined not to be performed by the error diffusion process. In addition, numeric values are the gradation values of pixels for which the error diffusion process has not been processed at each pixel position.

FIG. 16B is a diagram showing an error generated by the error diffusion process. In FIG. 16B, $e_{xy}$ is an error from the threshold value that is generated by the error diffusion process, and "*" denotes a target pixel that becomes a processing target.

FIG. 16C is a diagram showing an error-weighted matrix m1. In the error weighted matrix m1, a weighting value is attached to a relative position with respected to the "*" pixel position in FIG. 16B. By multiplying the entire matrix by $\frac{1}{48}$, the error weighted-matrix m1 is normalized.

The following Equation (1) is an equation that is used for calculating a corrected pixel value for the pixel position "*". In Equation (1), a corrected pixel value is acquired by the gradation value 221 of the pixel position "*" and a value calculated by multiplying the error $e_{xy}$ shown in FIG. 16B by a weighting value represented in the error-weighted matrix m1.

$$\text{Corrected Pixel Value} = 221 + \frac{1}{48}e_{10} + \frac{3}{48}e_{20} + \frac{5}{48}e_{30} \ldots + \frac{7}{48}e_{13} \quad (1)$$

The following Equation (2) is an equation that is used for determining whether a dot is to be formed at the pixel position "*".

$$\left.\begin{array}{l}\text{if Corrected Pixel Value} > \text{Threshold value}\\ e_{xy} = \text{Corrected Pixel Value} - 255 \ldots \text{(Dot On)}\\ \text{else}\\ e_{xy} = \text{Corrected Pixel Value} \ldots \text{(Dot Off)}\end{array}\right\} \quad (2)$$

In Equation (2), the corrected pixel value calculated in Equation (1) and the threshold value are compared to each other. When the corrected pixel value is greater than the threshold value, a dot is determined to be formed at the pixel position "*," and the error $e_{xy}$ at this pixel position is set as the value of (the corrected pixel value −255). On the other hand, when the corrected pixel value is equal to or less than the threshold value, a dot is not formed at the pixel position "*," and the corrected pixel value at this pixel position is set as the error $e_{xy}$.

In this embodiment, the quantized reference value is changed based on the difference in the characteristics of the heads, and thereby correcting the color unevenness. According to this method, since the correction effect can be directly applied to the error value of the target pixel, a correction effect corresponding to each head can be acquired in the joint portion to which the overlap process is applied. According to the method of changing the threshold value, correction is uniformly applied also to the error values of referenced peripheral pixels. Therefore, the error values of pixels of a head that does not originally need to be corrected are corrected as well, and the effect of the correction is weakened.

Figure 17:
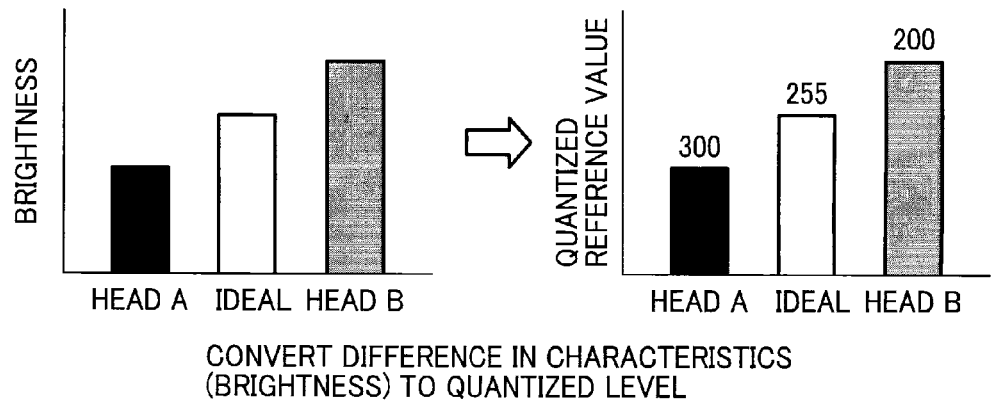
FIG. 17 is an explanatory diagram for explaining conversion of the characteristic variation of heads, the variation being expressed in the form of brightness, into a quantized reference value.
Figure 18:
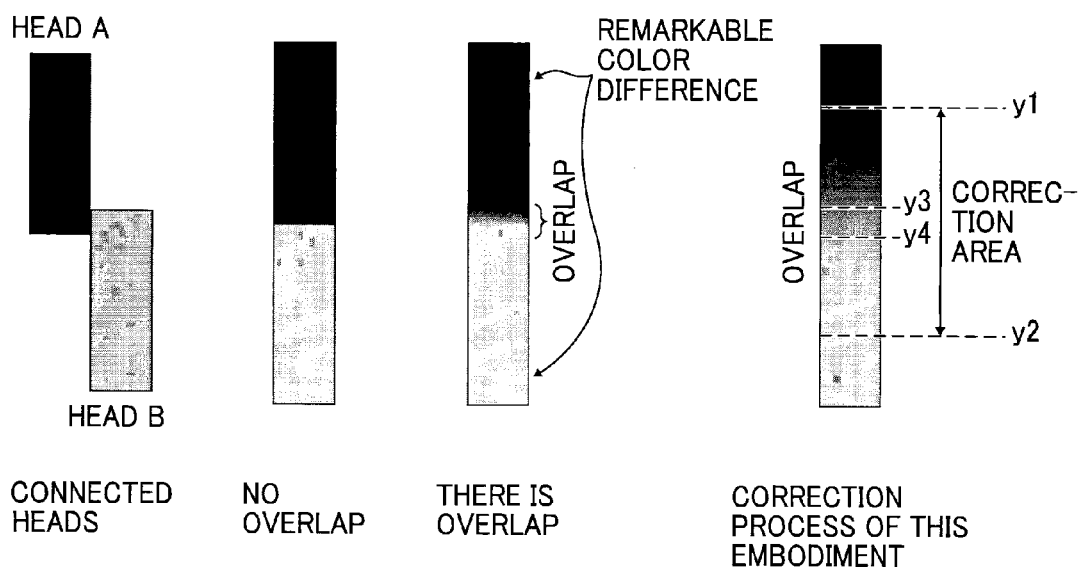
FIG. 18 is an explanatory view for explaining a correction process of the variation of the characteristics of the connected heads.

A method of substituting the difference in the characteristics of heads with the quantized reference value will be described with reference to FIGS. 17 and 18. In FIG. 17, a difference in the characteristics is represented in brightness. However, the difference in the characteristics may be any difference in the density or the saturation. A characteristic from which the degree of color unevenness can be measured and which can be measured by using a measurement device may be used. A head A is a head of which the output is excessively thickened with respect to that of an ideal head, and a head B is a head of which the output becomes thin.

When the heads A and B are connected together, extreme color unevenness occurs. FIG. 18 is a diagram representing this image of phenomena. A difference in the color differences cannot be corrected not only in a case where the heads are directly connected but also in a case where the overlap process is performed. However, by applying correction so as to slowly change the difference in the characteristics in a zone y1 to y2) that is wider than the overlap area (y3 to y4), the color unevenness can be formed so as not to be visually distinguished.

Next, a correction method using the quantized reference value will be described.

First, a quantized reference value in the correction zone (y1 to y4 in the case of the head A, and y3 to y2 in the case of the head B) of each head is calculated. Although there is a difference in the characteristics within the head as will be described later, the centers of the heads may be regarded as y1 and y2 by regarding the characteristics to be averaged for each head. In a case where the difference in the characteristics within the head is considered more precisely, a MAX point of the head of which the output is thick on the average and a MIN point of the head of which the output is thin on the average may be regarded as y1 and y2.

When the quantized reference value and the characteristic value (L) have a linear property, the quantized reference value can be acquired by using a simple linear equation. Particularly, since the brightness characteristics are generally designed such that the brightness is linear with respect to the quantized reference value, the quantized reference value can be easily calculated.

When the quantized reference value is represented in the following Equation (3), the quantized reference values of the heads A and B are as below.

Quantized Reference Value=$a*L+B$ (here, $a$ and $b$ are constant numbers)    (3)

Quantized Reference Value of Head $A=a*LA+b$ (300 in FIG. 17)

Quantized Reference Value of Head $B=a*LB+b$ (200 in FIG. 17)

Figure 19:
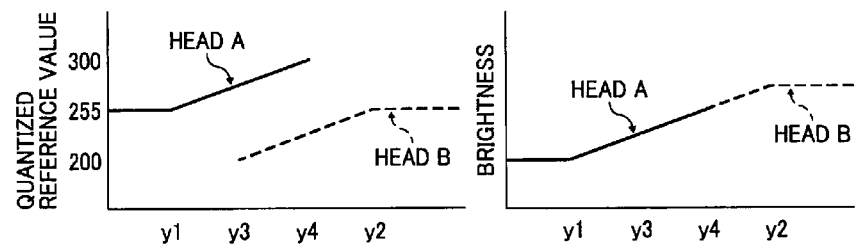
FIG. 19 is a diagram illustrating a quantized reference value for each head.

FIG. 19 is a diagram showing a quantized reference value for each head. As shown in FIG. 19, for pixels recorded by the head A, the quantized reference value may be slowly increased from the above-described quantized reference value to the quantized reference value of the head A toward y4 in the zone of y1 to y4. For the head B, reversely, the quantized reference value may be slowly increased from the quantized reference value of the head B to the above-described quantized reference value toward y3 to y2.

Since an increase in the quantized reference value leads to an increase in a negative error value for which a dot is not generated, in the correction process shown in FIG. 19, the density of generation of dots decreases for the head A so as to increase the brightness. In addition, for the head B, since the quantized reference value starts from a position lower than the ideal value, a state in which dots can be easily generated excessively is changed to an appropriate state, and thereby the brightness increases. Finally, the changes in the brightness of the heads A and B coincides with each other, and thereby the color unevenness is not visually distinguished.

An example of the characteristics in which the output of the head A is thick has been described with reference to FIGS. 17 to 19. However, in the reverse case, the graph of the quantized reference value shown in FIG. 19 is horizontally inverted.

In addition, in the overlap process area of y3 to y4, pixels recorded by each head are mixed. As the overlapping pattern, predetermined patterns as FIGS. 13A to 13D are defined in advance, and accordingly, a head to be used for recording can be determined based on the coordinates (x,y) of the pixel position. In other words, the quantized reference value can be defined as a function f(L,x,y) based on the head characteristics (L) and the pixel position (x,y).

The following Equation (4) is an equation used for calculating the quantized reference value of the head A, and the following Equation (5) is an equation used for calculating the quantized reference value of the head B.

$$f(L, x, y) = \text{Ideal Reference Value} + \left( \begin{array}{c} \text{Quantized Reference Value} \\ \text{of Characteristics of Head } A - \\ \text{Ideal Reference Value} \end{array} \right) \times \frac{(\text{Target Pixel Position } y - y1)}{(y4 - y1)} \quad (4)$$

$$f(L, x, y) = \text{Ideal Reference Value} + \left( \begin{array}{c} \text{Quantized Reference Value} \\ \text{of Characteristics of Head } B - \\ \text{Ideal Reference Value} \end{array} \right) \times \frac{(y2 - \text{Target Pixel Position } y)}{(y3 - y2)} \quad (5)$$

In the above-described equations, the brightness is assumed as the characteristics value. However, the brightness may be substituted with the density or the saturation.

Figure 20:
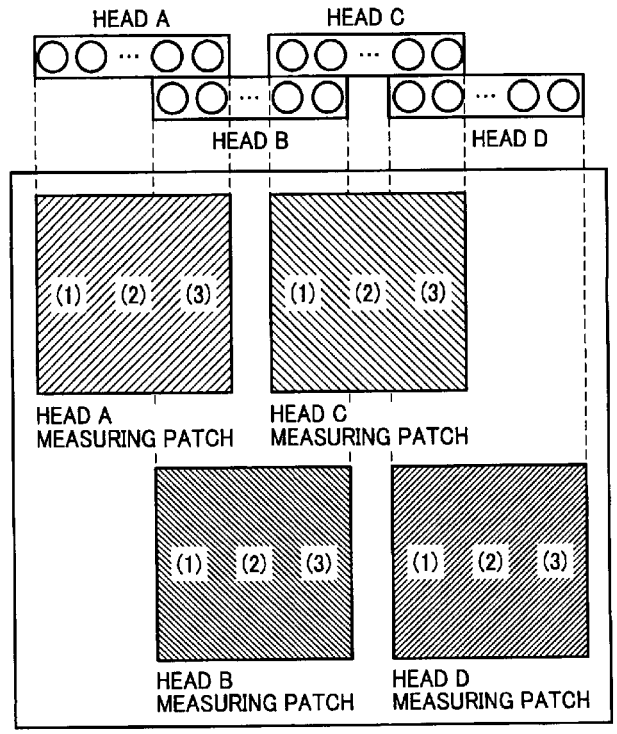
FIG. 20 is a diagram illustrating an example of a patch used for measuring color information for each main scanning line of the head.

FIG. 20 is a diagram representing an example of a patch used for measuring color information for each main scanning line of the head that includes the overlap process area. In FIG. 20, the vertical direction is the main scanning direction. In FIG. 20, one patch is output from each of four heads of heads A to D. The density, the brightness, the saturation, or the like is measured from the overlap process area and other areas in the sub scanning direction of each patch. In the figure, positions denoted by (1) to (3) are measurement positions. One or more measurement positions may be disposed in the overlap process area.

In addition, for acquisition of the color information, after a printed chart is measured by an operator by using a measurement device or the like, the measured value may be input. Furthermore, for acquisition of the color information, a value measured by the measurement device included in the image forming apparatus may be used for correction.

Figure 21:
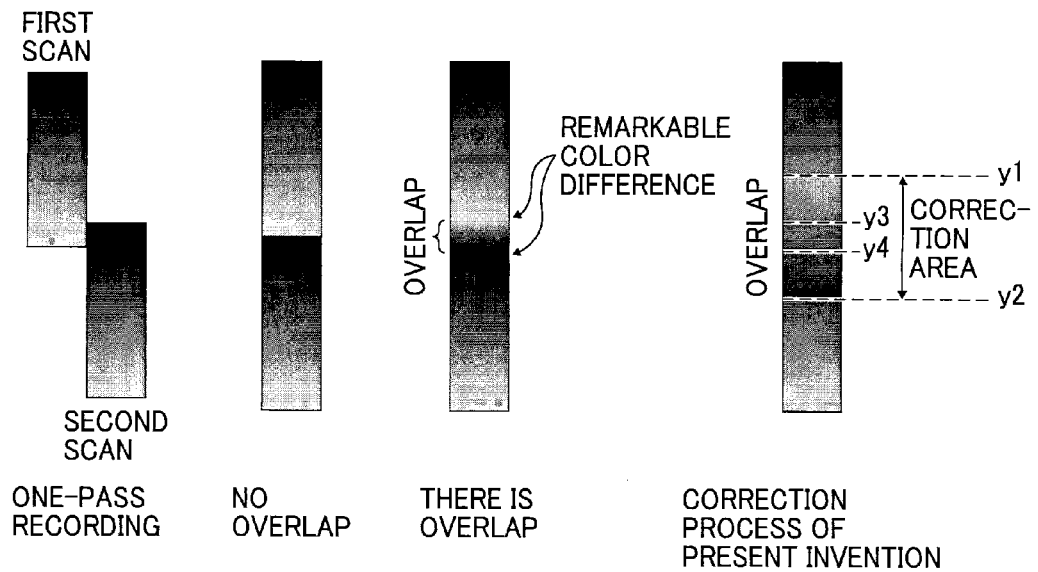
FIG. 21 is an explanatory diagram for explaining a process of correcting the variation in characteristics in one-pass recording.

FIG. 21 is a diagram representing a difference in the characteristics within a head in one-pass recording and an enhanced effect according to this embodiment. Similarly to the case of the connected head, color unevenness occurs with a new line portion used as the boundary. However, in the case of one-pass recording, the color unevenness occurs due to a difference in the characteristics within one head, and accordingly, a correction area needs to be set to be narrow as is necessary.

However, when the period of the variation is too short, the quantized reference values may be calculated by simply dividing the head vertically into two and calculating the quantized reference values by averaging the characteristic values (The quantized reference values are calculated also based on the averaged characteristic value, and are calculated as a quantized reference value of the upper portion of the head and a quantized reference value of the lower portion of the head).

In addition, while correction is changed for each head in the case of the connected heads, the quantized reference values are changed for the upper portion and the lower portion of the head in the case of one pass recording.

The measurement of the difference in the characteristics of the head and the calculation of the quantized reference value do not need to be performed in real time when the image processing is actually performed, and can be performed in advance. In addition, the pixel recording position and the corrected quantized reference value have one-to-one relation. Thus, the calculated result may be stored in, the recording buffer in advance so as to be read out at the time of actual image processing.

Figure 22:
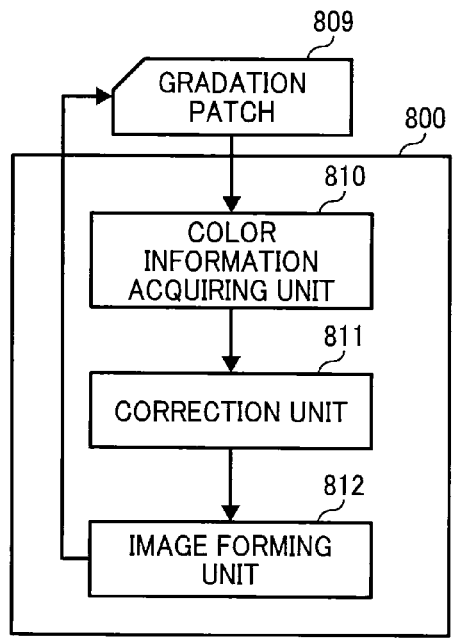
FIG. 22 is a diagram illustrating an example of the functional configuration of an image processing apparatus according to this embodiment.

FIG. 22 is a diagram representing an example of the functional configuration of an image processing apparatus according to this embodiment. An image processing apparatus 800 includes a color information acquiring unit 810, a correction unit 811, and an image forming unit 812. The color information acquiring unit 810, for example, acquires color information of a gradation patch that is scanned by a scanner or the like. In addition, in a case where the gradation patch is formed on a carriage belt or the like, the color information acquiring unit 810 acquires the color information based on a signal that is acquired by a sensor disposed in a conveying path of the carriage belt. The color information that is acquired by the color information acquiring unit 810, for example, is acquired from a plurality of positions in the sub scanning direction for the patch disposed for each main scanning line of the head shown in FIG. 20.

The correction unit 811 corrects the color from the color information acquired by the color information acquiring unit 810 based on color information of the overlap process area of one patch and color information of the overlap process area of a patch that is adjacent to the above-described patch in the sub scanning direction. The correction of the color, for example, is a correction process of the quantized reference value shown in FIG. 19.

The image forming unit 812 forms and outputs an image on a medium by using the color information that is corrected by the correction unit 811. In addition, the image forming unit 812 forms a path that is used for correcting the color output for each head on a paper sheet or the carriage belt.

A gradation patch 809, for example, includes a patch output for each head that is shown in FIG. 20.

Figure 5:
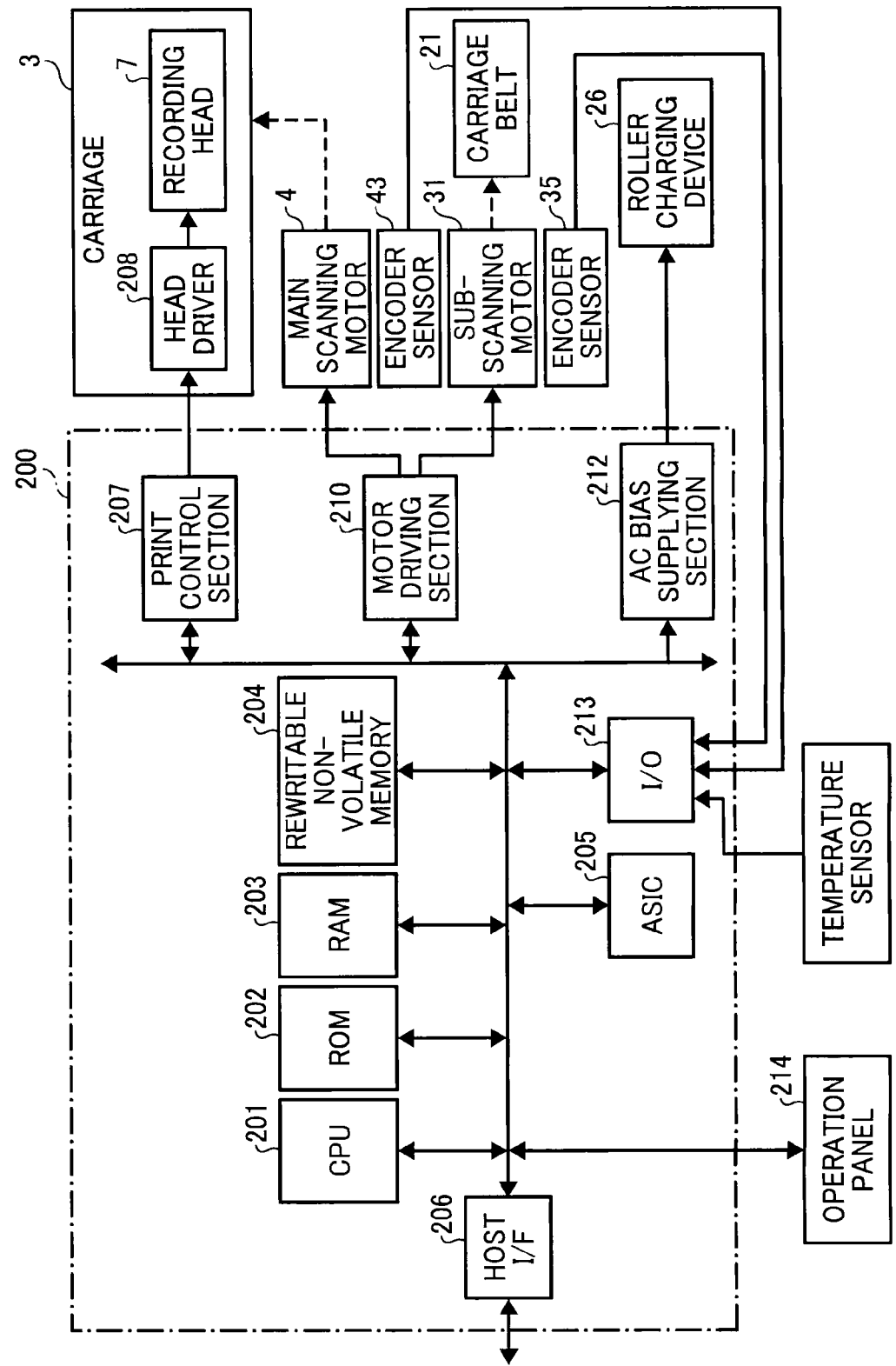
FIG. 5 is a block diagram illustrating the overview of a control unit of the image forming apparatus.

In addition, the color information acquiring unit 810, for example, is realized by the CPU 201 shown in FIG. 5 or the like, and acquires color information by processing a signal that is input from a scanner, a sensor, or the like not shown in the figure. In addition, the correction unit 811, for example, is realized by the CPU 201 shown in FIG. 5 or the like and generates a γ correction table in the ROM 202 or the like.

Figure 23:
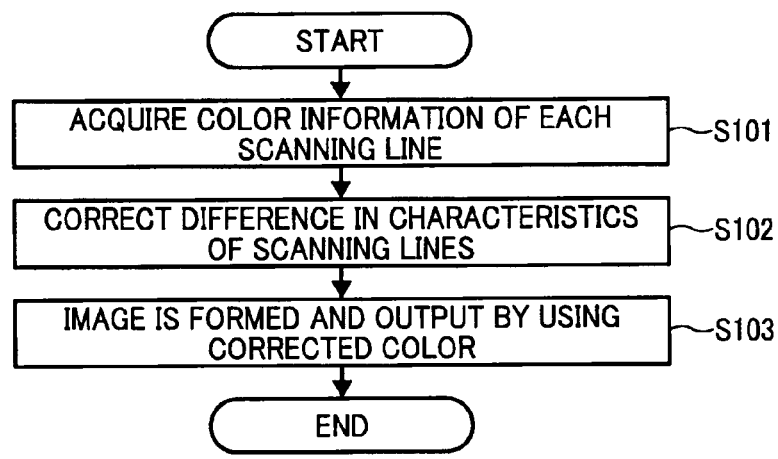
FIG. 23 is a flowchart illustrating an image processing method according to this embodiment.

FIG. 23 is a flowchart illustrating an image processing method according to the embodiment. As shown in FIG. 23, the color formed by the characteristics of the head that are different for each scanning line in the main scanning direction is corrected, and an image is formed.

In Step S101 shown in FIG. 23, the color information acquiring unit 810 acquires color information for each scanning line in the main scanning direction. After Step S101, the process proceeds to Step S102, and the correction unit 811 corrects the difference in the characteristics of adjacent scanning lines. After Step S102, the process proceeds to Step S103, and the image forming unit 812 forms and outputs an image by using colors of which the characteristics are corrected.

Figure 24:
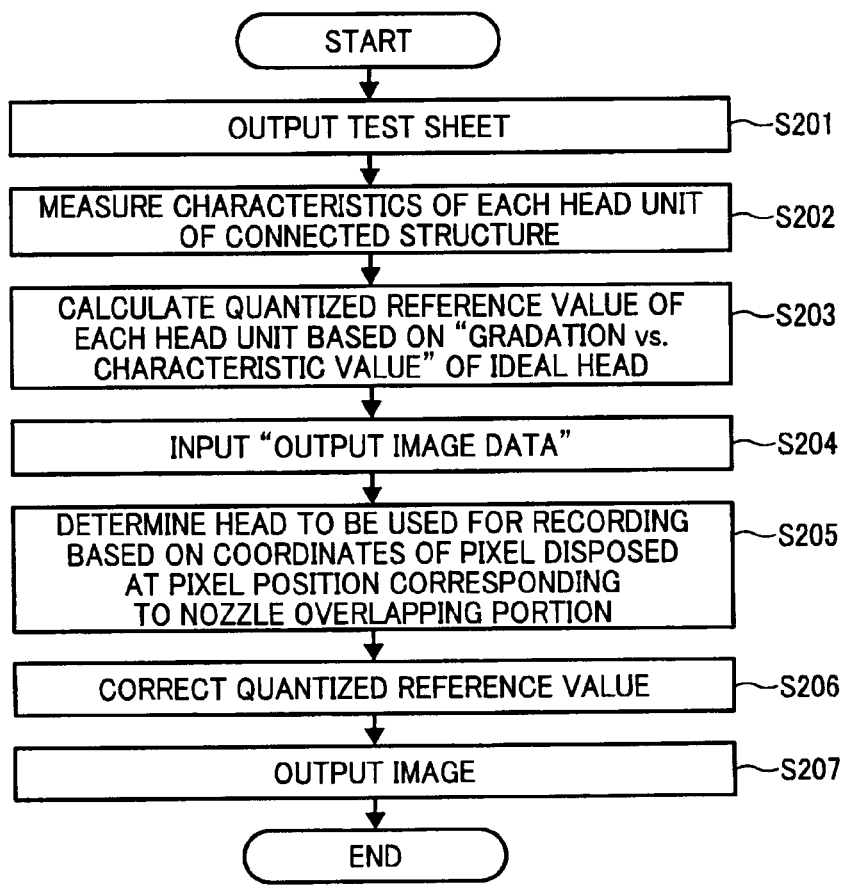
FIG. 24 is a flowchart illustrating am example of an image processing method according to this embodiment.

Next, an image processing method according to this embodiment will be further described in detail. FIG. 24 is a flowchart illustrating an example of the image processing method according to this embodiment.

First, the image forming unit 812 output a test pattern that is used for measuring color information of each head (head unit) (Step S201). As the test pattern, for example, a patch as shown in FIG. 20 can be used. The characteristics (the density, the brightness, the saturation, and the like) of each head are measured from the output test pattern by using a measurement device or the like (Step S202). The image processing apparatus 800 calculates a quantized reference value of each head unit by using the above-described Equation (3) based on the relation in the heads between the gradation value and the characteristic values (Step S203).

As described above, the measurement of the difference in the characteristics and the calculation of the quantized reference value (Steps S201 to S203) do not need to be performed in real time while the image processing is being performed, and may be configured to be performed in advance.

Next, the color information acquiring unit 810 receives (acquires) output image data as input (Step S204). More specifically, the color information acquiring unit 810 acquires the color information of each scanning line in the main scanning direction. Next, at a pixel position at which the nozzles of each head correspond to the overlapping portion, the correction unit 811 determines a head to be used for recording based on the coordinates of the pixel (Step S205). Next, the correction unit 811 corrects the quantized reference value of the head that is determined to be used as the recording head by using the above-described Equation (4) or Equation (5) (Step S206). In addition, at a pixel position located in an area other than the area (y1 to y2) that is broader than the overlap area (y3 to y4), the correction unit 811 does not correct the quantized reference value.

The image forming unit 812 forms and outputs an image of which the color unevenness is corrected by using the corrected quantized reference value (Step S207).

Figure 25:
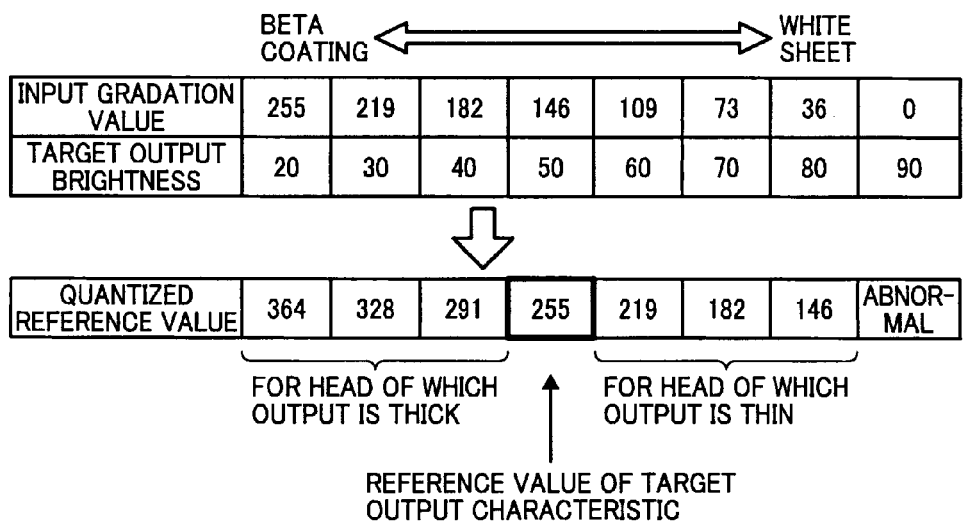
FIG. 25 is a diagram illustrating an example of the output characteristics of an ideal head.

Next, an example of the effect of using the function f(L,x,y) of the above-described Equations (4) and (5) will be described. FIG. 25 is a diagram showing an example of the output characteristics of an ideal head. FIG. 25 represents correspondence between the input gradation value and the output brightness. In the example shown in FIG. 25, the relation between the brightness and the gradation value can be approximated by a linear equation shown in the following Equation (6).

$$\text{Brightness} = -0.2745 \times \text{Gradation Value} + 90 \qquad (6)$$

A case where the quantized reference value is corrected on the premise of the relation of the approximated equation will be described. For example, when an output image having brightness of 50 is desired to be acquired, for a head of which the output has brightness of 40, that is, a head of which the output is thick, the quantized reference value in the error diffusion process is changed from 255 to 291. As the quantized reference value increases, the error $e_{xy}$ of a target pixel that is calculated by using the above-described Equation (2) may have a negative value more easily. Accordingly, when the error of the target pixel is referred to in the quantization calculation of the peripheral pixel, it becomes a factor suppressing formation of a dot.

To the contrary, for example, when an output image having brightness of 50 is desired to be acquired, for a head of which the output has brightness of 60, that is, a head of which the output is thin, the quantized reference value is changed from 255 to 219. Accordingly, the error $e_{xy}$ of a target pixel may have a positive value more easily. Therefore, when the error of the target pixel is referred to in the quantization calculation of the peripheral pixel, it becomes a factor promoting formation of a dot.

In this embodiment, in order to smoothly reflect the effect of the change in the quantized reference value, as shown in FIG. 19, the quantized reference value is changed based on the coordinates of the overlapping portion (that is, based on which of heads desired to be overlapped is nearer to).

Figure 26:
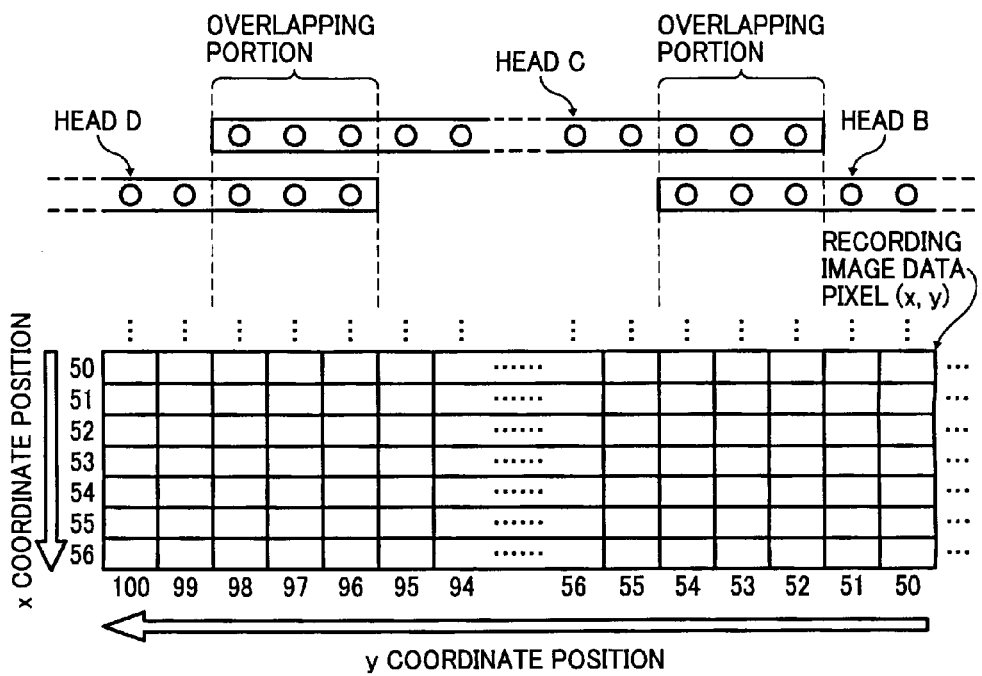
FIG. 26 is a diagram illustrating the relation between the nozzle positions of the connected heads and the coordinates of image data to be recorded.

Next, a specific example of the quantized reference value that is corrected in the overlapping portion will be described with reference to FIGS. 26 to 29. FIG. 26 is a diagram representing the relation between the nozzle position of a connected head and the coordinates of image data to be recorded. In FIG. 26, an example is shown in which the head B and the head C overlap with each other in a portion in which the y-coordinate position of the image data is in the range of 52 to 54, and the head C and the head D overlap with each other in a portion in which the y-coordinate position of the image data is in the range of 96 to 98.

Figure 27:
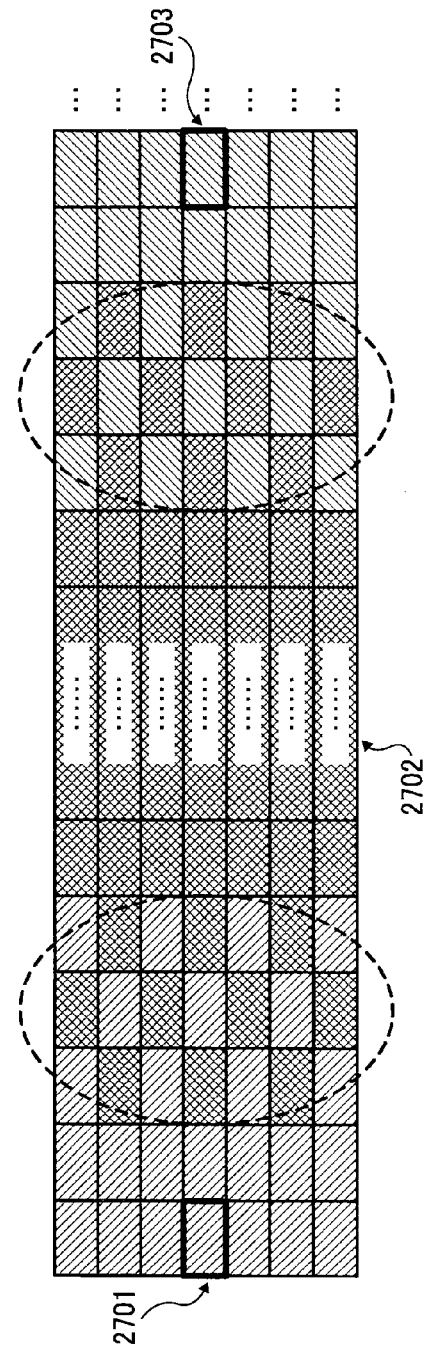
FIG. 27 is a diagram in which the pixel positions recorded by the heads are divided by patterns.

FIG. 27 is a diagram in which the pixel positions recorded by the heads are divided by patterns. The overlapping portion is divided by the head B and the head C or the head C and the head D as shown in the figure. A portion surrounded by a dotted circuit represents the overlapping portion. A pixel 2701, a pixel 2702, and a pixel 2703 represent pixels that are recorded by the head D, the head C, and the head B.

In FIG. 27, for simplification of the description, the number of pixels divided for each head is configured to be constant all the time. However, as shown in FIGS. 13A to 13D, a case where the number of nozzles is changed based on the number of heads that are closely located is more effective.

Figure 28:
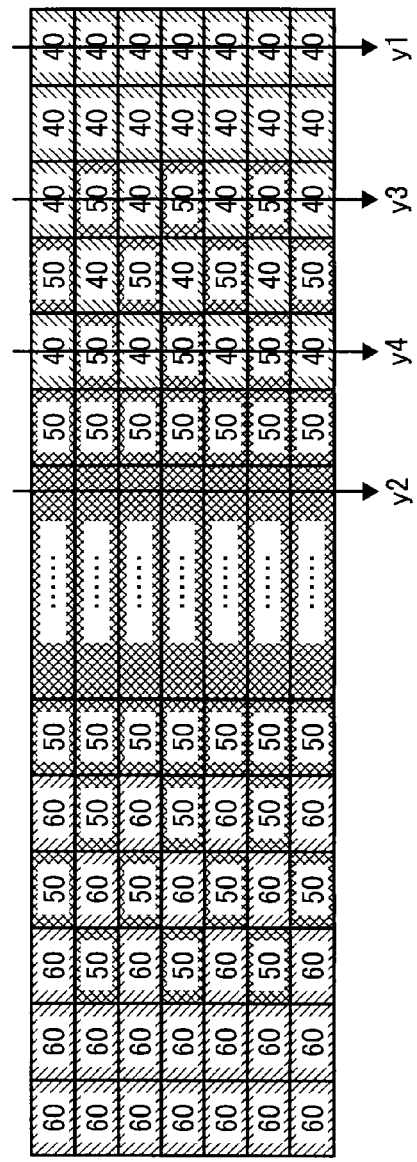
FIG. 28 is a diagram illustrating the brightness of an output image for every pixel position when a constant value is input to a head.

FIG. 28 is a diagram representing the brightness of an output image in units of pixel positions in a case where a constant value (in the example shown in FIG. 28, a gradation value of 146) is input to the head as shown in FIG. 26. FIG. 28 represents an example in which, even for the same input value, the head B outputs a thick image (brightness=40) and the head D outputs a thin image (brightness=60).

FIG. 29 is a diagram representing an example of a quantized reference value that is corrected by using the above-described Equation (4) or Equation (5). FIG. 29 shows changes in the quantized reference values at each pixel position. Since the head C originally has the ideal output characteristics, the quantized reference value is not changed from 255. In the head B of which the output is too thick, the quantized reference value is corrected to a value that is greater than 255. In addition, in the head D of which the output is too thin, the quantized reference value is corrected to a value that is less than 255. The quantized reference value is corrected only in a zone corresponding to y1 to y2, and the right side portion of y1 or the left side portion of y2 are not corrected. The reason for this is that in a case where the entire head is corrected, even when the density is constant, a decrease in the number of gradations or a change in the halftone pattern can be easily visually distinguished.

This embodiment is on the premise of using the error diffusion process. However, a dithering process may be applied depending on a recording system. In the dithering process, the quantization process can be performed at speed higher than that of the error diffusion process. Thus, for example, in a case where there is no difference in the characteristics of the head, high speed processing is required regardless of the difference in the characteristics, or the like, the dithering process may be used. The determination may be automatically made by a measurement device that is built in the recording system or may be made by an operator's input by checking an output test recording chart or the like.

Until now, the description has been made on the premise of performing ink jet recording. However, the present invention can be also applied to a recording method such as thermal transfer recording using thermal heads in which, similarly to ink jet, recording heads can scan or can be disposed in a linear shape by being connected to each other, and an image can be formed by dots.

According to an image processing apparatus, an image forming apparatus, and an image processing method of the present invention, it is possible to provide an image processing apparatus, an image forming apparatus, and an image processing method capable of resolving a variation in image characteristics of different, scanning lines without degrading the gradation characteristics.

As above, preferred embodiments of the present invention have been described. However, the present invention is not limited to the above-described preferred embodiments. The embodiments can be modified within the scope without departing from the gist of the present invention.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a color information acquirer configured to acquire color information of a scanning line of a head in a main scanning direction; and
a corrector configured to correct a parameter used for a halftone process of a scanning line in the main scanning direction and a parameter used for a halftone process of an adjacent line adjacent to the scanning line for error diffusion, and, based on the acquired color information and the corrected parameters, is configured to correct a color difference of the scanning line and the adjacent line, wherein:
the parameter for the halftone process of the scanning line corresponds to one or more quantized reference values for a first head portion having a property of a first value,
the parameter for the halftone process of the adjacent line corresponds to one or more quantized reference values for a second head portion having the property of a second value less than the first value, and
the one or more quantized reference values for the first head portion are greater than the one or more quantization reference values for the second head portion.

2. The image processing apparatus according to claim 1, wherein the color information acquirer is configured to acquire color information of a portion of the scanning line that overlaps the adjacent line and of a portion of the scanning line that does not overlap the adjacent line, and wherein the corrector is configured to correct the parameter used for the halftone process for the scanning line and adjacent scanning line for a range in which a color difference is generated at an end portion of the scanning line in a sub scanning direction.

3. The image processing apparatus according to claim 1, wherein the corrector is configured to correct the parameters for the scanning line and adjacent line such that a difference in gradations in a range from a center of the scanning line in a sub scanning direction to a center of the adjacent line in the sub scanning direction is substantially linear in the sub scanning direction.

4. The image processing apparatus according to claim 1, wherein the quantized reference values for the first head portion and the second head portion are defined by a function that varies depending on a difference in the property of the first and second head portions.

5. The image processing apparatus according to claim 4, further comprising: a storage area configured to store a table of the quantized reference values that are acquired by the corrector.

6. An image forming apparatus that forms an image by parallel scanning using a plurality of heads in a main scanning direction, or by scanning a plurality of lines using one head in the main scanning direction, wherein a difference in gradations of scanning lines in the main scanning direction is corrected by the image processing apparatus according to claim 1.

7. The image processing apparatus according to claim 1, wherein the property is density, saturation, or brightness.

8. The image processing apparatus according to claim 1, wherein the first head portion is adjacent the second head portion.

9. The image processing apparatus according to claim 8, wherein the first and second head portions at least partially overlap.

10. The image processing apparatus according to claim 1, wherein:
the controller is configured to correct the one or more quantized reference values for a first area corresponding to the first print head portion and to correct the one or more quantized reference values for a second area corresponding to the second print head portion, and
the first area partially overlaps the second area.

11. The image processing apparatus according to claim 10, wherein:
the one or more corrected quantized reference values for the first print head portion having a substantially linear pattern in a first section of the overlapping area, and
the one or more corrected quantized reference values for the second print head portion being substantially linear pattern in a second section of the overlapping area.

12. The image processing apparatus according to claim 11, wherein:
the substantially linear pattern of the one or more corrected quantized reference values for the first print head portion is adjacent the substantially linear pattern of the one or more corrected quantized reference values for the second print head to form a substantially continuous linear pattern.

13. The image processing apparatus according to claim 11, wherein:
the one or more corrected quantized reference values for the first print head portion has a pattern in a non-overlapping area different from the pattern in the first section, and
the one or more corrected quantized reference values for the second print head portion has a pattern in a non-overlapping area different from the pattern in the second section.

14. An image processing method comprising:
acquiring color information of each scanning line of each head in a main scanning direction;
correcting a parameter used for a halftone process of a scanning line in the main scanning direction and a parameter used for a halftone process of an adjacent line adjacent to the scanning line; and
correcting, based on the acquired color information and the corrected parameters, a color difference of the scanning line and the adjacent line, wherein:
the parameter for the halftone process of the scanning line corresponds to one or more quantized reference values for a first head portion having a property of a first value,
the parameter for the halftone process of the adjacent line corresponds to one or more quantized reference values for a second head portion having the property of a second value less than the first value, and
the one or more quantization reference values for the first head portion greater than the one or more quantization reference values for the second head portion.

15. The image processing method according to claim 14, wherein the property is density, saturation, or brightness.

16. The image processing method according to claim 14, wherein the first head portion is adjacent the second head portion.

17. The image processing method according to claim 14, wherein correcting the parameters for the adjacent scanning lines includes:
correcting the one or more quantized reference values for a first area corresponding to the first print head portion, and
correcting the one or more quantized reference values for a second area corresponding to the second print head portion, the first area partially overlapping the second area.

18. The image processing method according to claim 17, wherein:
the one or more corrected quantized reference values for the first print head portion having a substantially linear pattern in a first section of the overlapping area, and
the one or more corrected quantized reference values for the second print head portion being substantially linear pattern in a second section of the overlapping area.

19. The image processing-method according to claim 18, wherein:
the substantially linear pattern of the one or more corrected quantized reference values for the first print head portion is adjacent the substantially linear pattern of the one or more corrected quantized reference values for the second print head to form a substantially continuous linear pattern.

* * * * *